(12) United States Patent
Koui et al.

(10) Patent No.: US 8,325,442 B2
(45) Date of Patent: Dec. 4, 2012

(54) SPIN TORQUE OSCILLATOR, MAGNETIC RECORDING HEAD, MAGNETIC HEAD ASSEMBLY AND MAGNETIC RECORDING APPARATUS

(75) Inventors: Katsuhiko Koui, Tokyo (JP); Mariko Shimizu, Kanagawa-ken (JP); Kenichiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 307 days.

(21) Appl. No.: 12/591,055

(22) Filed: Nov. 5, 2009

(65) Prior Publication Data

US 2010/0110592 A1    May 6, 2010

(30) Foreign Application Priority Data

Nov. 6, 2008   (JP) ................ P2008-285830

(51) Int. Cl.
*G11B 5/33* (2006.01)
(52) U.S. Cl. .............................. 360/128
(58) Field of Classification Search ............ 360/128, 360/122, 137, 125.31, 323
See application file for complete search history.

(56) References Cited

U.S. PATENT DOCUMENTS

| | | | |
|---|---|---|---|
| 4,103,315 A | 7/1978 | Hempstead et al. |
| 4,945,528 A | 7/1990 | Crasemann |
| 5,695,864 A | 12/1997 | Slonczewski |
| 5,748,399 A | 5/1998 | Gill |
| 5,768,066 A | 6/1998 | Akiyama et al. |
| 5,898,546 A | 4/1999 | Kanai et al. |
| 5,920,447 A | 7/1999 | Sakata et al. |
| 6,011,664 A | 1/2000 | Kryder et al. |
| 6,094,328 A | 7/2000 | Saito |
| 6,153,062 A | 11/2000 | Saito |
| 6,278,576 B1 | 8/2001 | Ogata et al. |
| 6,282,069 B1 | 8/2001 | Nakazawa et al. |
| 6,519,119 B1 | 2/2003 | van der Heijden et al. |
| 6,580,589 B1 | 6/2003 | Gill |
| 6,583,969 B1 | 6/2003 | Pinarbasi |
| 6,591,479 B2 | 7/2003 | Nakazawa et al. |
| 6,608,739 B1 | 8/2003 | Tanaka et al. |

(Continued)

FOREIGN PATENT DOCUMENTS

JP   64-070947    3/1989

(Continued)

OTHER PUBLICATIONS

Zhu et al., "Microwave Assisted Magnetic Recording (MAMR)", Data Storage Systems Center, Carnegie Mellon University, B6, pp. 34-35.

(Continued)

*Primary Examiner* — Allen Cao
(74) *Attorney, Agent, or Firm* — Nixon & Vanderhye, P.C.

(57) ABSTRACT

A spin torque oscillator includes a first magnetic layer, a second magnetic layer and a first nonmagnetic layer. The first magnetic layer includes a magnetic film of a magnetic material with a body-centered cubic (bcc) structure and an oriented {110} plane of the body-centered cubic structure, the oriented {110} plane being oriented substantially parallel to a principal plane of the magnetic film. The first nonmagnetic layer is disposed between the first magnetic layer and the second magnetic layer. In addition, a magnetic moment in the magnetic film precesses around an axis substantially parallel to the principal plane. Furthermore, a magnetic field is applied in a direction substantially perpendicular to the principal plane, and a current is passed perpendicularly to the principal plane.

17 Claims, 10 Drawing Sheets

U.S. PATENT DOCUMENTS

| | | |
|---|---|---|
| 6,621,664 B1 | 9/2003 | Trindade et al. |
| 6,697,231 B1 | 2/2004 | Kikuiri |
| 6,785,092 B2 | 8/2004 | Covington et al. |
| 6,809,900 B2 | 10/2004 | Covington |
| 6,927,952 B2 | 8/2005 | Shimizu et al. |
| 6,937,446 B2 | 8/2005 | Kamiguchi et al. |
| 6,977,108 B2 | 12/2005 | Hieda et al. |
| 6,982,845 B2 | 1/2006 | Kai et al. |
| 7,106,555 B2 | 9/2006 | Kikuiri et al. |
| 7,119,990 B2 | 10/2006 | Bajorek et al. |
| 7,145,752 B2 | 12/2006 | Ueda et al. |
| 7,154,707 B2 | 12/2006 | Watabe et al. |
| 7,256,955 B2 | 8/2007 | Pokhil et al. |
| 7,397,633 B2 | 7/2008 | Xue et al. |
| 7,461,933 B2 * | 12/2008 | Deily et al. ............. 347/102 |
| 7,466,525 B2 | 12/2008 | Hasegawa et al. |
| 7,471,491 B2 | 12/2008 | Sato et al. |
| 7,473,478 B2 | 1/2009 | Sbiaa et al. |
| 7,486,475 B2 * | 2/2009 | Biskeborn ............. 360/121 |
| 7,504,898 B2 | 3/2009 | Fukuzawa et al. |
| 7,532,433 B2 | 5/2009 | Kawato et al. |
| 7,532,434 B1 | 5/2009 | Schreck et al. |
| 7,593,185 B2 | 9/2009 | Yazawa |
| 7,616,412 B2 | 11/2009 | Zhu et al. |
| 7,675,129 B2 | 3/2010 | Inomata et al. |
| 7,724,469 B2 | 5/2010 | Gao et al. |
| 7,732,881 B2 | 6/2010 | Wang |
| 7,764,136 B2 | 7/2010 | Suzuki |
| 7,791,829 B2 | 9/2010 | Takeo et al. |
| 7,808,330 B2 | 10/2010 | Fukuzawa et al. |
| 7,911,882 B2 | 3/2011 | Shimazawa et al. |
| 7,957,098 B2 | 6/2011 | Yamada et al. |
| 8,139,322 B2 | 3/2012 | Yamada et al. |
| 8,154,825 B2 | 4/2012 | Takashita et al. |
| 8,164,854 B2 | 4/2012 | Takagishi et al. |
| 2001/0017752 A1 | 8/2001 | Hoshiya et al. |
| 2002/0006013 A1 | 1/2002 | Sato et al. |
| 2002/0051330 A1 | 5/2002 | Heijden et al. |
| 2002/0075595 A1 | 6/2002 | Sato et al. |
| 2002/0097536 A1 | 7/2002 | Komuro et al. |
| 2002/0136927 A1 | 9/2002 | Hieda et al. |
| 2003/0026040 A1 | 2/2003 | Covington et al. |
| 2003/0090844 A1 | 5/2003 | Shimizu et al. |
| 2004/0150912 A1 | 8/2004 | Kawato et al. |
| 2004/0190197 A1 | 9/2004 | Watabe et al. |
| 2004/0228045 A1 | 11/2004 | Hasegawa et al. |
| 2005/0023938 A1 | 2/2005 | Sato et al. |
| 2005/0105213 A1 | 5/2005 | Takeo et al. |
| 2005/0110004 A1 | 5/2005 | Parkin et al. |
| 2005/0207050 A1 | 9/2005 | Pokhil |
| 2005/0219771 A1 | 10/2005 | Sato et al. |
| 2006/0171051 A1 | 8/2006 | Wachenschwanz et al. |
| 2006/0198047 A1 | 9/2006 | Xue et al. |
| 2006/0221507 A1 | 10/2006 | Sato et al. |
| 2007/0063237 A1 | 3/2007 | Huai et al. |
| 2007/0109147 A1 | 5/2007 | Fukuzawa et al. |
| 2008/0019040 A1 | 1/2008 | Zhu et al. |
| 2008/0112087 A1 | 5/2008 | Clinton et al. |
| 2008/0117545 A1 | 5/2008 | Batra et al. |
| 2008/0129401 A1 | 6/2008 | Fukuzawa et al. |
| 2008/0137224 A1 | 6/2008 | Gao et al. |
| 2008/0150643 A1 | 6/2008 | Suzuki et al. |
| 2008/0218891 A1 | 9/2008 | Gubbins et al. |
| 2008/0268291 A1 | 10/2008 | Akiyama et al. |
| 2008/0304176 A1 | 12/2008 | Takagishi et al. |
| 2009/0052095 A1 | 2/2009 | Yamada et al. |
| 2009/0059417 A1 | 3/2009 | Takeo et al. |
| 2009/0059418 A1 | 3/2009 | Takeo et al. |
| 2009/0059423 A1 | 3/2009 | Yamada et al. |
| 2009/0080105 A1 | 3/2009 | Takashita et al. |
| 2009/0080106 A1 | 3/2009 | Shimizu et al. |
| 2009/0080120 A1 | 3/2009 | Funayama et al. |
| 2009/0088095 A1 | 4/2009 | Kayano et al. |
| 2009/0097167 A1 | 4/2009 | Sato et al. |
| 2009/0097169 A1 | 4/2009 | Sato et al. |
| 2009/0115541 A1 | 5/2009 | Persson et al. |
| 2009/0225465 A1 | 9/2009 | Iwasaki et al. |
| 2009/0257151 A1 | 10/2009 | Zhang et al. |
| 2009/0262457 A1 | 10/2009 | Rivkin et al. |
| 2009/0316303 A1 | 12/2009 | Yamada et al. |
| 2009/0316304 A1 | 12/2009 | Funayama et al. |
| 2010/0007992 A1 | 1/2010 | Yamada et al. |
| 2010/0007996 A1 | 1/2010 | Iwasaki et al. |
| 2010/0110592 A1 | 5/2010 | Koui et al. |
| 2010/0134922 A1 | 6/2010 | Yamada et al. |
| 2010/0220415 A1 | 9/2010 | Yamada et al. |
| 2011/0038080 A1 | 2/2011 | Alex et al. |
| 2011/0205655 A1 | 8/2011 | Shimizu et al. |
| 2011/0299192 A1 | 12/2011 | Yamada et al. |
| 2011/0300409 A1 | 12/2011 | Yamada et al. |

FOREIGN PATENT DOCUMENTS

| | | |
|---|---|---|
| JP | 05-20635 | 1/1993 |
| JP | 07-244801 | 9/1995 |
| JP | 2002-100005 | 4/2002 |
| JP | 2002-208744 | 7/2002 |
| JP | 2002-279616 | 9/2002 |
| JP | 2004-192744 | 7/2004 |
| JP | 2004-207707 | 7/2004 |
| JP | 2004-295987 | 10/2004 |
| JP | 2005-108315 | 4/2005 |
| JP | 2005-525663 | 8/2005 |
| JP | 2005-285242 | 10/2005 |
| JP | 2005-310363 | 11/2005 |
| JP | 2006-147023 | 6/2006 |
| JP | 2006-209960 | 8/2006 |
| JP | 2006-209964 | 8/2006 |
| JP | 2006-286855 | 10/2006 |
| JP | 3833512 | 10/2006 |
| JP | 2007-012264 | 1/2007 |
| JP | 2007-035251 | 2/2007 |
| JP | 2007-124340 | 5/2007 |
| JP | 2007-184923 | 7/2007 |
| JP | 2007-193906 | 8/2007 |
| JP | 2008-123669 | 5/2008 |
| JP | 2008-176908 | 7/2008 |
| KR | 1020030039289 | 5/2003 |
| WO | 2006-101040 | 9/2006 |

OTHER PUBLICATIONS

Zhu et al., "Bias-Field-Free Microwave Oscillator Driven by Perpendicularly Polarized Spin Current", IEEE Transactions on Magnetics, vol. 42, No. 10, Oct. 2006, pp. 2670-2671.

Zhu et al., "Microwave Assisted Magnetic Recording (MAMR)", Data Storage Systems Center, Carnegie Mellon University, B6, pp. 34-35, Reference IEEE, vol. 42, p. 2670 (2006).

S. Maat et al., "Magnetotransport Properties and Spin-Torque Effects in Current Perpendicular to the Plane Spin Valves with Co-Fe-Al Magnetic Layers", Journal of Applied Physics 101, 2007, San Jose Research Center, Hitachi Global Storage Technologies, 3403 Yerba Buena Road, San Jose CA 95135, 6 pages.

Park et al., "Effect of Adjacent Layers on Crystallization and Magnetoresistance in CoFeB/MgO/CoFeB Magnetic Tunnel Junction", IEEE Transactions of Magnetics, vol. 42, No. 10, Oct. 2006.

Shen et al., "Effect of Film Roughness in MgO-based Magnetic Tunnel Junctions", Applied Physics Letters 88, 182508 (2006).

Akiyama et al., U.S. Appl. No. 12/109,760, filed Apr. 25, 2008.
Yamada et al., U.S. Appl. No. 12/153,490, filed May 20, 2008.
Yamada et al., U.S. Appl. No. 12/155,329, filed Jun. 2, 2008.
Takagishi et al., U.S. Appl. No. 12/155,473, filed Jun. 4, 2008.
Takeo et al., U.S. Appl. No. 12/196,628, filed Aug. 22, 2008.
Takeo et al., U.S. Appl. No. 12/196,841, filed Aug. 22, 2008.
Iwasaki et al., U.S. Appl. No. 12/232,014, filed Sep. 9, 2008.
Takashita et al., U.S. Appl. No. 12/232,391, filed Sep. 16, 2008.
Funayama et al., U.S. Appl. No. 12/232,392, filed Sep. 16, 2008.
Shimizu et al., U.S. Appl. No. 12/232,469, filed Sep. 17, 2008.
Yamada et al., U.S. Appl. No. 12/382,940, filed Mar. 26, 2009.
Iwasaki et al., U.S. Appl. No. 12/457,657, filed Jun. 17, 2009.
Takagishi et al., U.S. Appl. No. 12/461,027, filed Jul. 29, 2009.
Yamada et al., U.S. Appl. No. 12/780,269, filed May 13, 2010.
Yamada et al., U.S. Appl. No. 13/214,012, filed Aug. 19, 2011.
Yamada et al., U.S. Appl. No. 13/214,033, filed Aug. 19, 2011.

* cited by examiner

SPIN TORQUE OSCILLATOR, MAGNETIC RECORDING HEAD, MAGNETIC HEAD ASSEMBLY AND MAGNETIC RECORDING APPARATUS

CROSS REFERENCE TO RELATED APPLICATION

This application is based upon and claims the benefit of priority from the Japanese Patent Application No. 2008-285830, filed on Nov. 6, 2008, the entire contents of which are incorporated herein by reference.

FIELD OF THE INVENTION

The present invention relates to a spin torque oscillator, a magnetic recording head, a magnetic head assembly, and a magnetic recording apparatus.

DESCRIPTION OF THE BACKGROUND

In the 1990s, the practical application of an MR (Magneto-Resistive effect) head and a GMR (Giant Magneto-Resistive effect) head has contributed to the skyrocketing of the recording density and capacity of an HDD (Hard Disk Drive). However, since the problem of heat fluctuation of a magnetic recording medium became conspicuous in the early 2000s, the speed of the increase in recording density slowed down temporarily. Even so, a perpendicular magnetic recording was put in practical use in 2005, the perpendicular magnetic recording being more advantageous to high density recording theoretically than an longitudinal magnetic recording. This event triggers a recent growth rate of 40% for the recording density of an HDD.

According to a latest demonstration experiment for an HDD, 400 Gbits/inch$^2$ has been attained. If this trend continues strongly, a recording density of 1 Tbits/inch$^2$ is expected to be attained around 2012. However, it will not be easy to attain such a high recording density even employing the perpendicular magnetic recording, because the problems of heat fluctuation will still become conspicuous.

A "high-frequency magnetic field assist recording method" is proposed as a recording method which can solve this problem (U.S. Pat. No. 6,011,664). In the high-frequency magnetic field assist recording method, the magnetic field with a frequency sufficiently higher than a recording signal frequency near the resonant frequency of a magnetic recording medium is locally applied to the medium. As a result, the medium resonates, and a portion of the medium, to which the high frequency magnetic field is applied, has a coercive force half or less than that of the medium without any field applied thereto. According to this effect, it is possible to write into a magnetic recording medium with a higher coercive force and higher anisotropy energy (Ku) by superimposing the high frequency magnetic field onto the recording field thereof. However, the method employs a coil to generate the high frequency magnetic field, making it difficult to efficiently apply the high frequency magnetic field to the medium.

Consequently, a method employing a spin torque oscillator has been proposed (for example, US-A20050023938, US-A20050219771, US-A20080019040, IEEE Trans. On Magn., Vol. 42, No. 10, PP. 2670). In the method disclosed, the spin torque oscillator includes a spin injection layer, a nonmagnetic layer, a magnetic layer and electrodes. A direct current is passed through the spin torque oscillator via the electrodes to cause ferromagnetic resonance of magnetization in the magnetic layer, the ferromagnetic resonance being due to spin torque by spin injection. As a result, the spin torque oscillator generates the high frequency magnetic field.

Since the spin torque oscillator is about tens of nm in size, the high frequency magnetic field generated localizes in an area of about tens of nm near the spin torque oscillator. Furthermore, the in-plane component of the high frequency magnetic field allows it to cause the ferromagnetic resonance in a perpendicularly magnetized medium and to substantially reduce the coercive force of the medium. As a result, a high-density magnetic recording is performed only in a superimposed area of a recording field generated from a main magnetic pole and the high frequency magnetic field generated from the spin torque oscillator. This allows it to use a medium with a high coercive force (Hc) and high anisotropy energy (Ku). For this reason, the problem of heat fluctuation can be avoided at the time of high density recording.

In order to make a recording head for the high-frequency magnetic field assist recording, it becomes important to design and produce the spin torque oscillator capable of providing a stable oscillation with a low driving current and generating an in-plane high-frequency magnetic field to sufficiently cause a magnetic resonance of the magnetization in the medium.

A maximum current density which can be passed through the spin torque oscillator is $2\times10^8$ A/cm$^2$, for example when the oscillator is about 70 nm in size. The current density beyond this value deteriorates the characteristic of the spin torque oscillator, e.g., owing to heating and electromigration thereof. For this reason, it is important to design a spin torque oscillator capable of oscillating with a current density as low as possible.

On the other hand, a reference discloses a criterion to fully cause a magnetic resonance of the medium magnetization. That is, it is desirable to make the intensity of the in-plane high frequency magnetic field not less than 10% of the anisotropy field (Hk) of the medium (see, for example, TMRC B6 (2007), "Microwave Assisted Magnetic Recording (MAMR)"). In order to increase the intensity of the in-plane high frequency magnetic field, the following items are required:
1) Increasing the saturation magnetization of an oscillation layer;
2) Increasing the thickness of the oscillation layer; and
3) Increasing a deflection angle of a precession motion of the magnetization in the oscillation layer, the deflection angle being defined as an angle between the magnetization and an external magnetic field.
However, all the items give rise to an increase in the driving current.

There exists trade-off between lowering the driving current density and increasing the intensity of the in-plane high frequency magnetic field. It is desirable to develop a spin torque oscillator capable of realizing a lower driving current density and the higher intensity of the in-plane high frequency magnetic field simultaneously.

US-A20050110004 discloses an example employing an FeCoAl alloy as a material of the free layer in a longitudinal magnetization memory with TMR. US-A20070063237 discloses an example employing a Heusler alloy. FeCoAl was also employed in a longitudinal magnetization CPP-GMR head (J. of Appl. Phys., Vol. 101, P.093905 (2007)).

SUMMARY OF THE INVENTION

According to a first aspect of the invention, a spin torque oscillator includes a first magnetic layer, a second magnetic layer and a first nonmagnetic layer. The first magnetic layer includes a magnetic film of a magnetic material with a body-centered cubic (bcc) structure and an oriented {110} plane of the body-centered cubic structure. The oriented {110} plane is oriented substantially parallel to a principal plane of the magnetic film. The first nonmagnetic layer is disposed between the first magnetic layer and the second magnetic layer. In addition, a magnetic moment in the magnetic film precesses around an axis substantially parallel to the principal plane. Furthermore, a magnetic field is applied in a direction substantially perpendicular to the principal plane, and a current is passed perpendicularly to the principal plane.

According to a second aspect of the invention, a magnetic recording head includes a main magnetic pole, a return magnetic pole and the spin torque oscillator according to the first aspect of the invention. In addition, the main magnetic pole generates a write-in magnetic field to be applied to a magnetic recording medium, and the return magnetic pole refluxes the write-in magnetic field returned from the magnetic recording medium. Furthermore, the spin torque oscillator is arranged parallel to the main magnetic pole.

According to a third aspect of the invention, another magnetic recording head includes a main magnetic pole and the spin torque oscillator according to the first aspect of the invention. The main magnetic pole generates a write-in magnetic field to be applied to a magnetic recording medium. The second magnetic layer included in the spin torque oscillator refluxes the write-in magnetic field returned from the magnetic recording medium.

According to a fourth aspect of the invention, a magnetic recording head assembly includes the magnetic recording head according to the second aspect or the third aspect of the invention, a head slider to mount the magnetic recording head, a suspension to mount the head slider on an end of the suspension and an actuator arm connected to the other end of the suspension.

According to a fifth aspect of the invention, a magnetic recording apparatus includes a magnetic recording medium, the magnetic head assembly according to the fourth aspect of the invention, a head slider, a suspension, an actuator arm and a signal processing portion. The head slider mounts the magnetic recording head. The suspension mounts the head slider on an end thereof. The actuator arm is connected to the other end of the suspension. The signal processing portion performs write-in of a signal into the magnetic recording medium and read-out of a signal from the magnetic recording medium by using the magnetic recording head mounted on the magnetic head assembly.

BRIEF DESCRIPTION OF DRAWINGS

The accompanying drawings, which are incorporated in and constitute a part of this specification, illustrate embodiments of the invention and together with the description, serve to explain the principles of the invention.

DETAILED DESCRIPTION OF THE EMBODIMENTS

Figure 1:
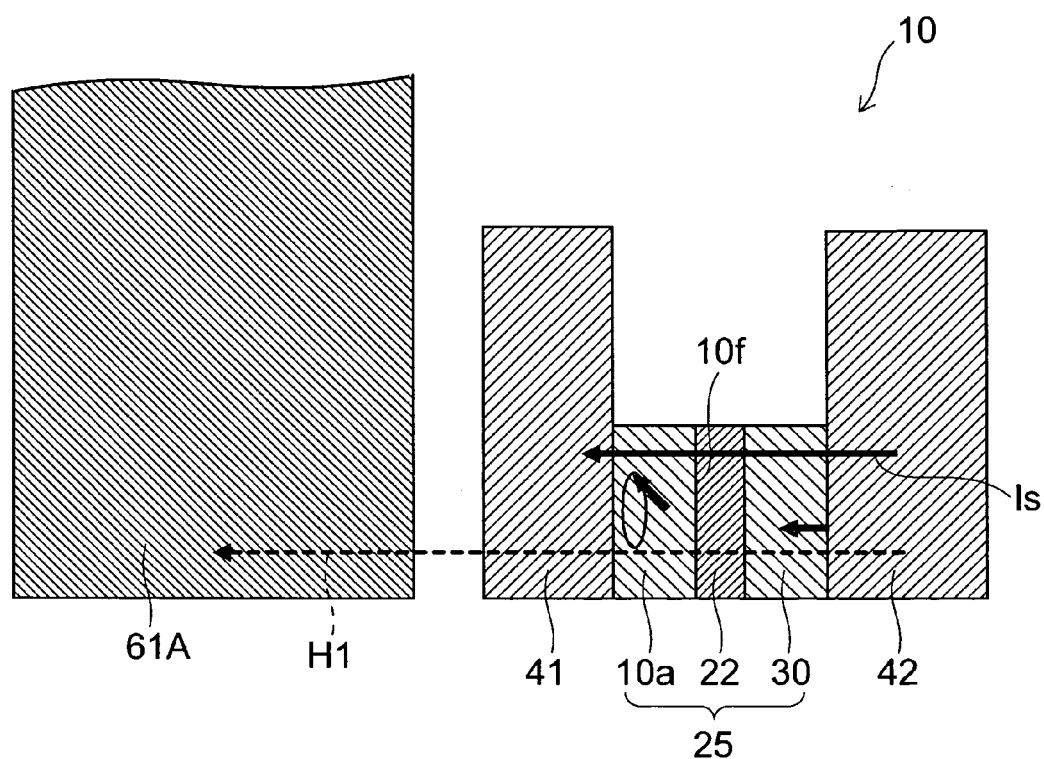
FIG. 1 is a sectional view illustrating the configuration of a spin torque oscillator according to a first embodiment of the present invention.

Embodiments of the present invention are explained below with reference to accompanying drawings. The drawings are conceptual. Therefore, a relationship between the thickness and width of each portion and a proportionality factor among respective portions are not necessarily the same as an actual thing. Even when the same portions are drawn, their sizes or proportionality factors are represented differently from each other with respect to the drawings. The embodiments of the invention will be described below with reference to accompanying drawings. Wherever possible, the same reference numerals will be used to denote the same or like portions throughout the detailed description and the figures.

First Embodiment

FIG. 1 is a sectional view illustrating a configuration of a spin torque oscillator according to a first embodiment of the present invention. As shown in FIG. 1, the spin torque oscillator 10 according to the first embodiment of the invention has a laminated structure 25 which is provided with an oscillation layer (amorphous soft magnetic layer) 10a, a spin injection layer (hard magnetic layer) 30, and a nonmagnetic layer 22 disposed between the oscillation layer 10a and the spin injection layer 30.

The oscillation layer 10a is a magnetic film including a magnetic material with a body-centered cubic (bcc) structure, and orients so that a plane parallel to a {110} plane of the bcc structure is a principal plane 10f. The "principal plane" is defined as a plane parallel to a lamination plane of the laminated structure 25. The {110} plane includes a crystallographically equivalent planes such as a (110) plane, a (101) plane, a (011) plane, etc. Below, it is assumed that the {110} plane is a (110) plane. Alternatively, a magnetic film including a magnetic material with a bcc structure may be provided to a portion of the oscillation layer 10a, and the (110) plane of the bcc structure may orient substantially parallel to the principal plane 10f. Below, in order to explain simply, it is assumed that the oscillation layer 10a includes a magnetic material with a bcc structure over the whole thickness thereof, and the (110) plane direction orients substantially parallel to the principal plane 10f.

On the other hand, the spin injection layer 30 is provided on the side of the principal plane 10f of the oscillation layer 10a. The spin injection layer 30 is provided parallel to the principal plane 10f (lamination plane). And an intermediate layer 22 is inserted between the oscillation layer 10a and the spin injection layer 30. That is, the intermediate layer 22 is sandwiched between the oscillation layer 10a and the spin injection layer 30.

A magnetic field H1 with a component perpendicular to the principal plane 10f is applied to the laminated structure 25. That is, the magnetic field H1 generated from a magnetic pole 61A being disposed near the spin torque oscillator 10 is applied to the laminated structure 25. The magnetic field H1 is substantially perpendicular to the principal plane 10f. The magnetic field H1 may not be strictly perpendicular to the principal plane 10f, and the perpendicular component thereof should be just larger than the parallel component thereof to the principal plane 10f. The magnetic pole 61A can be used as a main magnetic pole in a magnetic recording head mentioned later.

A current Is is passed through the laminated structure 25 perpendicularly to the principal plane 10f. For example, as shown in the figure, a first electrode 41 is formed on the side opposite to the intermediate layer 22 of the oscillation layer 10a, and a second electrode 42 is formed on the side opposite to the intermediate layer 22 of the spin injection layer 30, thereby causing the current Is to be passed through the laminated structure 25 perpendicularly to the principal plane 10f by passing the current Is between the first and second electrodes 41, 42.

Materials, which are hard to oxidize and have low resistances, such as Ti, Cu, etc. may be employed for the first and second electrodes 41 and 42. It is preferable to provide Cu at the interface between the first electrode 41 and the oscillation layer 10a. This is because the Cu interface allows it to prevent Boron atoms contained in the oscillation layer 10a from diffusing into the first electrode 41.

Alternatively, the laminated structure 25, i.e., the spin torque oscillator 10 may be further provided with the first and second electrodes 41, 42 mentioned above. Furthermore, at least one of the first and second electrodes 41, 42 mentioned above may double as at least one of the main magnetic pole and a return magnetic pole mentioned later.

A case where the first and second electrodes 41, 42 are formed in addition to the spin torque oscillator 10 is explained below.

The current Is flows in the direction from the second electrode 42 to the first electrode 41, i.e., in the direction from the spin injection layer 30 to the oscillation layer 10a, for example. The current Is also flows in the reverse direction. Thereby, the laminated structure 25 serves as the spin torque oscillator where the magnetic moment of the oscillation layer 10a precesses around an axis with the direction perpendicular to the principal plane 10f (the lamination plane).

The current Is is required to flow from the spin injection layer 30 to the oscillation layer 10a when the magnetization direction of the oscillation layer 10a and the magnetization direction of the spin injection layer 30 are parallel to each other. However, the current Is is required to flow from the oscillation layer 10a to the spin injection layer 30 when the magnetization direction of the oscillation layer 10a and the magnetization direction of the spin injection layer 30 are anti-parallel to each other.

The laminated structure 25 has been microfabricated when the laminated structure 25 is viewed from the direction perpendicular to the lamination plane thereof. The size of the laminated structure 25 is designed in accordance with the area thereof which generates a high frequency magnetic field.

When the size of the laminated structure 25, i.e., the sectional area cut along a plane parallel to the principal plane 10f exceeds 200 nm, the oscillation layer 10a is susceptible to the variation in the spin injection effect, thereby making the oscillation difficult as a result. The larger the size, the greater the absolute value of the critical current for the oscillation. This often causes large Joule heating to deteriorate the laminated structure 25. Therefore, the size is preferably 200 nm or less. Furthermore, the size is more preferably 100 nm or less.

For example, making the laminated structure 25 as a square with 100 nm on a side yields a positive characteristic. The smaller the size is, the more Joule heating thereof can be suppressed. For this reason, it is preferable that the size of the laminated structure 25 is as small as possible after defining the area thereof to which a magnetic field is applied.

A magnetic field H1 applied from the magnetic pole 61A to the laminated structure 25 serves to orient the magnetization directions of the oscillation layer 10a and the spin injection layer 30 perpendicularly to the film surface of the laminated structure 25. The direction of the magnetic field H1 is perpendicular to the film surface, as shown in FIG. 1. However, even if the direction of the magnetic field H1 is not completely perpendicular to the film surface, it is allowable that the perpendicular component of the magnetic field H1 is larger than the in-plane component thereof. The magnetic field H1 may be in the direction from the spin injection layer 30 to the oscillation layer 10a or in the direction from the oscillation layer 10a to the spin injection layer 30.

It is necessary to inject a spin current with the spin directions oriented as much as possible in one direction from the spin injection layer 30. Therefore, it is preferable that the spin injection layer 30 has magnetic anisotropy in a direction perpendicular to the film surface (perpendicular to the principal plane 100. Specifically, it is preferable that the spin injection layer 30 has a structure including a Co—Pt alloy, a Co—Pd alloy, an Fe—Pt alloy, an Fe—Pd alloy, a TbFeCo alloy, a Co/Pt laminated structure, a Co/Pd laminated structure, a Co/Ni laminated structure.

When the spin injection layer 30 is magnetically soft, the magnetization direction in the spin injection layer 30 is in disorder as a result of a high-frequency magnetic field originating from the precession motion of the magnetization in the oscillation layer 10a, thereby making impossible the generation of the spin current. Therefore, it is preferable that the perpendicular magnetic anisotropy of the spin injection layer 30 is as large as possible. Specifically, it is preferable that the perpendicular magnetic anisotropy of the spin injection layer 30 is 10 kOe or higher.

In addition, the spin injection layer 30 is preferably 5 nm in thickness or thicker in order to acquire the stable spin current and the perpendicular magnetic anisotropy. When the spin injection layer 30 is thinner than 5 nm, it becomes difficult to acquire a well crystallized layer, thereby lowering the perpendicular magnetic anisotropy.

In addition, the thinner the spin injection layer 30, the higher the demagnetizing coefficient thereof. That is, the thinner spin injection layer 30 is disadvantageous in respect of the magnetic stability of the laminated structure 25 which is microfabricated. From this point, the thickness of the spin injection layer 30 is more preferably 10 nm in thickness or thicker.

Alternatively, the spin injection layer 30 includes a laminated structure of a perpendicular magnetic anisotropy film and a soft magnetic film. Specifically, a soft magnetic layer including at least one of Fe, Co and Ni is disposed on the side of the intermediate layer 22 to be laminated on a perpendicular magnetic anisotropy film. This allows it to enhance the spin-polarization rate of the spin current injected, and to consequently enhance the efficiency of spin torque transfer. At this time, if the soft magnetic layer is thickened too much, the perpendicular magnetic anisotropy will lower drastically. For this reason, the thickness of the soft magnetic layer laminated is preferably 5 nm in thickness or thinner.

The oscillation layer 10a has a body-centered cubic (bcc) structure. That is, the oscillation layer 10a is a bcc metal ferromagnetic layer. Furthermore, the oscillation layer 10a makes the plane direction of bcc (110) as a principal plane 10f. Namely, the oscillation layer 10a is laminated in a bcc (110) direction. Thereby, an oscillation driving current can be lowered when the axis of the magnetization precession coincides with a direction perpendicular to the film plane of the oscillation layer 10a.

The evaluation of the oscillation layer 10a employed for the spin torque oscillator 10 according to this embodiment is explained below. That is, a $Fe_{50}Co_{50}$ layer which is a bcc magnetic alloy layer was deposited on an underlayer including a laminated film formed of Ta and Ru films in the bcc (110) direction, thereby preparing a sample 1.

In addition, the sample 1 was evaluated for a bcc (110) orientation therein using an X-ray analysis separately. Here, the bcc (110) orientation means that the bcc (110) planes grow epitaxially in the film depositing direction. In the sample 1, it was confirmed using a TEM (Transmission Electron Microscope) that the sample 1 is polycrystalline with crystal grains of about 10 to 20 nm in size.

As a comparative example, a $Fe_{50}Co_{50}$ film was formed on an MgO (100) substrate, and annealed at 400° C. to prepare the comparative sample 1. In addition, the comparative sample 1 was evaluated using an X-ray analysis to confirm the bcc (100) orientation therein. It was also confirmed using the TEM that the sample 1 is polycrystalline with crystal grains of about 20 nm in size.

The measurements of a Gilbert damping factor α (referred to simply as a damping factor α hereinafter) on the sample 1 and the comparative sample 1 are shown in Table 1.

TABLE 1

|  |  | α1 | α2 |
|---|---|---|---|
| Sample 1 | bcc (110) $Fe_{50}Co_{50}$ on Ta/Ru | 0.0045 | 0.004 |
| Comparative sample 1 | bcc (100) $Fe_{50}Co_{50}$ on MgO (100) | 0.0045 | 0.0045 |

The damping factor α was estimated using a ferromagnetic resonance (FMR) measurement. The damping factor α1 is a damping factor estimated with a magnetic field applied parallel to the film planes of the samples for the FMR measurement. And a perpendicular damping factor α2 is a damping factor estimated with a magnetic field applied perpendicularly to the film planes of the samples for the FMR measurement. Making the magnetic field direction correspond to the direction of the magnetic field H1 shown in FIG. 1 allows it to acquire a damping factor which correlates with a current density to actually drive the spin torque oscillator 10. In addition, the perpendicular damping factor α2 corresponds to a damping factor when the magnetic field applied to the samples is in the direction of the magnetic field H1 shown in FIG. 1.

As shown in Table 1, the parallel damping factors α1 of the sample 1 and the comparative sample 1 are the same (when the magnetic field is parallel to the film planes), and the difference of the crystal orientations between the sample 1 and the comparative sample 1 results in no difference of the parallel damping factors.

On the other hand, the perpendicular damping factor α2 of the sample 1 is smaller than that of the comparative sample 1.

Since the driving current density is proportional to the damping factor α, the driving current can be reduced for the spin torque oscillator 10 with the oscillation layer 10a. The oscillation layer 10a has the axis of the magnetization precession perpendicular to the bcc (110) plane.

Thus, a spin torque oscillator with high intensity of the high frequency in-plane magnetic field is provided according to the spin torque oscillator 10 of the embodiment, thereby being capable of performing an oscillation with a low current density.

Examples of the bcc-metal magnetic layer showing such a characteristic include bcc alloys containing Fe, such as an Fe—Co alloy, an Fe—Ni alloy, and an Fe—Co—Ni alloy, etc. The bcc magnetic film of which {110} planes orient substantially parallel to the principal plane 10f thereof is referred to as a "bcc (110) magnetic layer" hereinafter.

The bcc (110) magnetic layer can be employed for the oscillation layer 10a, and further over the entire layer thickness of the oscillation layer 10a. Alternatively, the oscillation layer 10a at this time does not necessarily need to be formed of one kind of the bcc (110) magnetic layer, and may be formed of two or more kinds of the bcc (110) magnetic layers. Specifically, the oscillation layer 10a may include a laminated structure of, e.g., Fe-containing alloys each having a different Fe composition ratio.

Furthermore, the oscillation layer 10a may include a laminated structure of the bcc (110) magnetic layer and another magnetic layer different from the bcc (110) magnetic layer. For example, in order to adjust a magnetic film thickness (magnetization×film thickness: tesla×nm) of the oscillation layer 10a, the bcc (110) magnetic layer of the oscillation layer 10a may be laminated on fcc (face-centered cubic) alloys and amorphous alloys. Specifically, the bcc (110) magnetic layer may be laminated additionally on an fcc alloy containing Ni and an hcp (hexagonal close packed) alloy containing Co. Then, the number of the additional layers laminated on the bcc (110) magnetic layer is arbitrary.

The bcc (110) magnetic layer is preferably 1 nm in thickness or thicker when the bcc (110) magnetic layer and the additional magnetic layers are laminated. When the oscillation layer 10a is thinner than 1 nm, the oscillation layer 10a is not well crystallized so that a damping factor α peculiar to the material is hard to acquire, thereby significantly lowering the effect for reducing the oscillation driving current. The thickness of the bcc (110) magnetic layer is preferably not less than a half of the thickness of the oscillation layer 10a. When the bcc (110) magnetic layer exceeds a half of the thickness of the oscillation layer 10a, the bcc (110) magnetic layer contributes to the entire damping factor of the oscillation layer 10a, thereby enhancing the effect for reducing the driving current.

In addition, when the oscillation layer 10a includes the bcc (110) magnetic layer laminated on another magnetic layer, the bcc (110) magnetic layer is preferably disposed on the side of the intermediate layer 22 (the side of the spin injection layer 30). The closer the bcc (110) magnetic layer is disposed to the intermediate layer 22 (the spin injection layer 30), the larger the effect for reducing the driving current is.

The thickness of the oscillation layer 10a is designed so as to sufficiently obtain the high frequency magnetic field for which the magnetic thickness of the oscillation layer 10a is needed. On the other hand, the demagnetizing coefficient of the oscillation layer 10a becomes large with thinning the oscillation layer 10a, thereby causing an unstable oscillation easily. Therefore, the thickness of the oscillation layer 10a is preferably not less than 5 nm when an element including the oscillation layer 10a is a square with 200 nm on a side. When the element is a rectangle, it is more preferable that the thickness is one tenth or more of the long side length of the rectangle.

First Example

A spin torque oscillator 101 (not shown in the figure) according to the first example of the invention is a spin torque oscillator made employing a bcc (110)-oriented $Fe_{50}Co_{50}$ film for the oscillation layer 10a. That is, the following were employed:
the bcc (110)-oriented $Fe_{50}Co_{50}$ film with a thickness of 5 nm, which was formed on an 10 nm-thick laminated underlayer formed of a Ta film and a Ru film, was employed for the oscillation layer 10a;
a 20-nm thick Cu film was employed for the intermediate layer 22; and
a CoPt film was employed for the spin injection layer 30.

A spin torque oscillator 101c (not shown) was made employing a bcc (100)-oriented $Fe_{50}Co_{50}$ film for the oscillation layer 10a.
That is, the following were employed:
a 5-nm thick $Fe_{50}Co_{50}$ film, which was formed on a 10 nm-thick MgO (100) layer, was employed for the oscillation layer 10a;
a 20-nm thick Cu film was employed for the intermediate layer 22; and
a CoPt film was employed for the spin injection layer 30.
In the spin torque oscillators 101 and 101c, the section cut parallel to the lamination plane of the laminated structure 25 is a square with 50 nm on a side.

Figure 2:
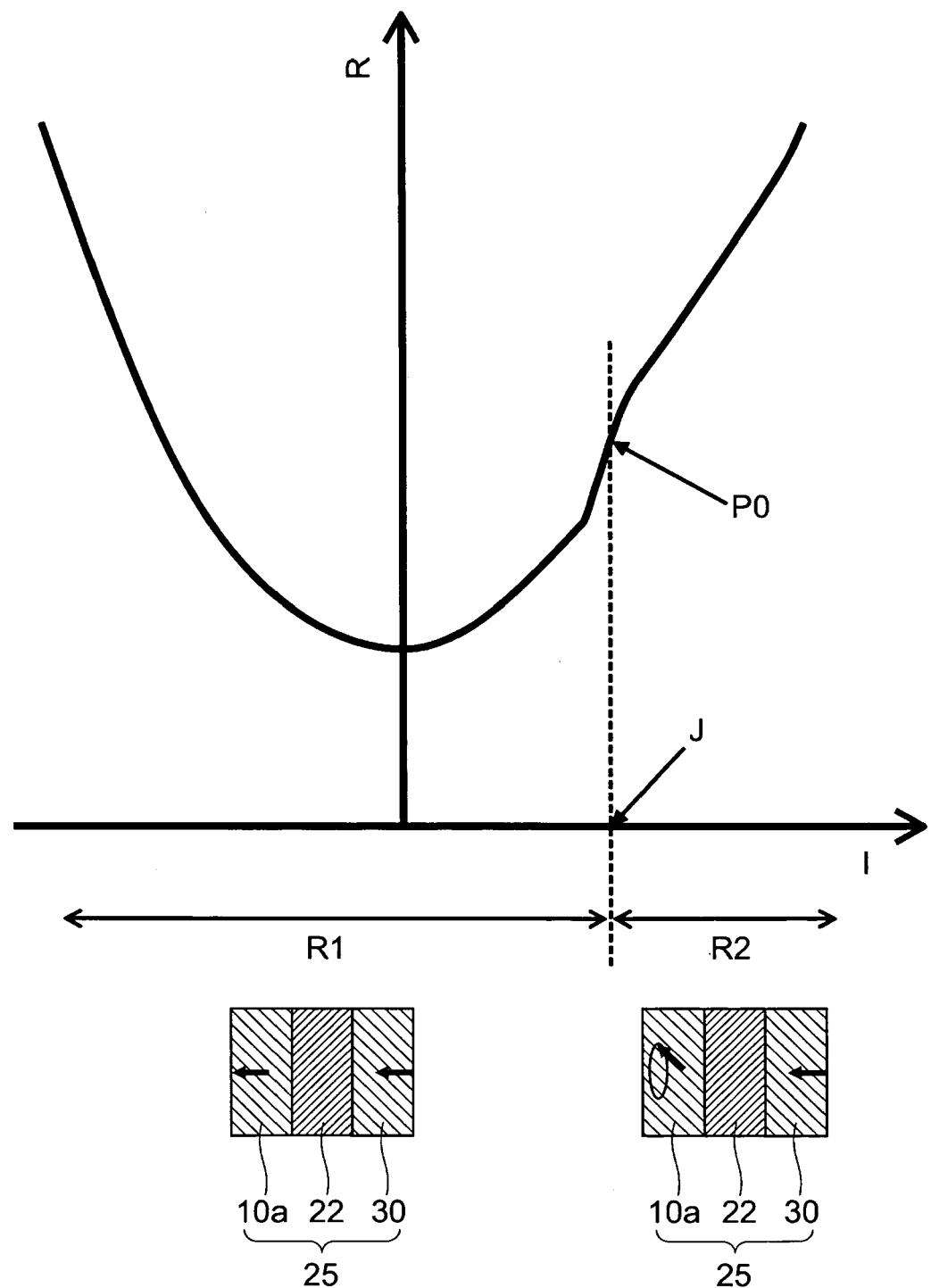
FIG. 2 is a schematic view illustrating a measuring method of the driving current J in the spin torque oscillator according to the first embodiment of the invention.

Then, a driving current J was measured for the spin torque oscillators 101, 101c. FIG. 2 is a schematic view illustrating a measuring method of the driving current J in the spin torque oscillator according to the embodiment of the invention. That is, FIG. 2 is a schematic graph showing a relationship between the current and the resistance in the spin torque oscillator, and the horizontal and vertical axes represent the current I and the resistance R, respectively, in FIG. 2.

As shown in FIG. 2, the driving current J of the spin torque oscillator is detected by a singular point P0. The singular point P0 appears in a change of the resistance R measured when a relationship between the resistance R and the current I is evaluated with a constant magnetic field applied to the spin torque oscillator. The resistance R is a resistance between the oscillation layer 10a and the spin injection layer 30. In the first current range R1 where the current is lower than the current value for the singular point P0, the magnetization of the oscillation layer 10a and the magnetization of the spin injection layer 30 are approximately parallel to each other. On the other hand, in the second current range R2 where the current is larger than the current value for the singular point P0, the magnetization of the oscillation layer 10a and the magnetization of the spin injection layer 30 are not parallel to each other, and do a certain angle. Thus, when spin torque acts on the magnetization of the oscillation layer 10a, the magnetization precesses to break a parallelism between the magnetization of the oscillation layer 10a and the magnetization of the spin injection layer 30, thereby causing a giant magnetoresistance (GMR) effect. Then, a current I corresponding to the singular point P0 is obtained as a driving current J. In this measurement, the external magnetic field applied to the spin torque oscillator is 10 kOe.

The measurement for the driving current J of the spin torque oscillator 101 of the first example and the spin torque oscillator 101c of the comparative example is shown in Table 2.

TABLE 2

| | | J |
|---|---|---|
| 101 | (Ta/Ru)/10 nm-$Fe_{50}Co_{50}$/5 nm-Cu/20 nm-CoPt | 5 mA |
| 101c | MgO (100)/10 nm-$Fe_{50}Co_{50}$/5 nm-Cu/20 nm-CoPt | 6 mA |

As shown in Table 2, the driving current J of the spin torque oscillator 101 of the first example can be reduced in comparison with the spin torque oscillator 101c of the comparative example.

Second Embodiment

A spin torque oscillator 12 (not shown) according to a second embodiment of the invention employs a bcc alloy including Fe with at least one of Al, Si, Ga, Ge, P, Sn, and Cu added by a composition ratio of 5 atomic %. Except this, the spin torque oscillator 12 is the same as the spin torque oscillator 10. Thus, the explanation is omitted thereon.

The material with the above elements added is employed for the oscillation layer 10a of the spin torque oscillator 12 according to this embodiment to change the electronic state of the metal magnetic layer, thereby allowing it to reduce the damping factor $\alpha$.

When the concentration of the added element is less than 5 atomic %, the influence of the added element on the electronic state becomes small, thereby significantly lowering the effect for reducing the driving current J. When the concentration exceeds 50 atomic %, the magnetism of the oscillation layer 10a becomes unstable, thereby requiring that the concentration is below 50 atomic %. From these viewpoints, the concentration is more preferably from 7 atomic % to 40 atomic %.

The characteristic evaluation of the oscillation layer 10a to be employed for the spin torque oscillator 12 according to this embodiment is explained below. A bcc alloy $Fe_{35}CO_{35}Al_{30}$ layer was prepared in the bcc (110) direction on a laminated underlayer including a Ta film and a Ru film to provide a sample 2.

As a comparative example, a $Fe_{35}Co_{35}Al_{30}$ film was formed on an MgO (100) substrate, and then annealed at 400° C. to prepare a comparative sample 2 with the bcc (100) orientation.

The measurement for the damping factor $\alpha$ of the example 2 and the comparative example 2 is shown in Table 3.

TABLE 3

| | Layered structure | a1 | a2 |
|---|---|---|---|
| Sample 2 | bcc (110) $Fe_{50}Co_{50}$ on Ta/Ru | 0.003 | 0.0015 |
| Comparative sample 2 | bcc (110) $Fe_{50}Co_{50}$ on MgO (100) | 0.003 | 0.0031 |

As shown in Table 3, the sample 2 with the bcc (110) orientation has a perpendicular damping factor $\alpha 2$ remarkably lower than that of the comparative sample 2.

As compared with the $Fe_{50}CO_{50}$ of the sample 1 shown in Table 1, the sample 2 containing 30 atomic % of Al has an effect for improving $\alpha 2$ compared with the comparative example 2, as shown in Table 3. That is, the difference of the damping factor $\alpha 2$ between the sample 2 and the comparative sample 2 is larger than that between the sample 1 and the comparative sample 1. Thus, it is found that the addition of Al has a remarkable effect for reducing the damping factor in a direction perpendicular to the film plane. Based on this result, the elements such as Al, Si, Ga, Ge, P, Sn, Cu, etc. are added to the material of the oscillation layer 10a in the spin torque oscillator 12 according to the embodiment.

Thus, according to the spin torque oscillator 12 according to this embodiment, a spin torque oscillator capable of oscillating stably with a low current density and generating high intensity of the high frequency in-plane magnetic field can be provided.

Second Example

A spin torque oscillator 102 (not shown) according to a second example of the invention is a spin torque oscillator made employing a bcc (110)-oriented $Fe_{35}Co_{35}Al_{30}$ film for the oscillation layer 10a.
That is, the following were employed:
the bcc (110)-oriented $Fe_{35}Co_{35}Al_{30}$ film with a thickness of 5 nm, which was formed on an 14 nm-thick laminated underlayer formed of a Ta film and a Ru film, was employed for the oscillation layer 10a;
a 20-nm thick Cu film was employed for the intermediate layer 22; and
a CoPt film was employed for the spin injection layer 30.
A spin torque oscillator 102c (not shown) was made employing a bcc (100)-oriented $Fe_{35}Co_{35}Al_{30}$ film for the oscillation layer 10a as a comparative example.
That is, the following were employed:
a 5-nm thick $Fe_{35}Co_{35}Al_{30}$ film, which was formed on a 14 nm-thick MgO (100) layer, was employed for the oscillation layer 10a;
a 20-nm thick Cu film was employed for the intermediate layer 22; and
a CoPt film was employed for the spin injection layer 30.
In the spin torque oscillators 102 and 102c, the section cut parallel to the lamination plane of the laminated structure 25 is a square with 50 nm on a side.
The measurements for the driving current J of the spin torque oscillator 102 of the second example and the spin torque oscillator 102c of the comparative example are shown in Table 2.

TABLE 4

|  |  | J |
|---|---|---|
| 102 | (Ta/Ru)/14 nm-$Fe_{35}Co_{35}Al_{30}$/5 nm-Cu/20 nm-CoPt | 5 mA |
| 102c | MgO (100)/14 nm-$Fe_{35}Co_{35}Al_{30}$/5 nm-Cu/20 nm-CoPt | 6 mA |

As shown in Table 4, the driving current J of the spin torque oscillator 102 of the second example can be reduced in comparison with the spin torque oscillator 102c of the comparative example. The driving current J of the spin torque oscillator 102 of the second example can be further reduced by 60% of that of the spin torque oscillator 101 of the first example. Thus, the driving current can be further reduced by employing the Al-added material for the oscillation layer 10a.

Third Embodiment

Figure 3:
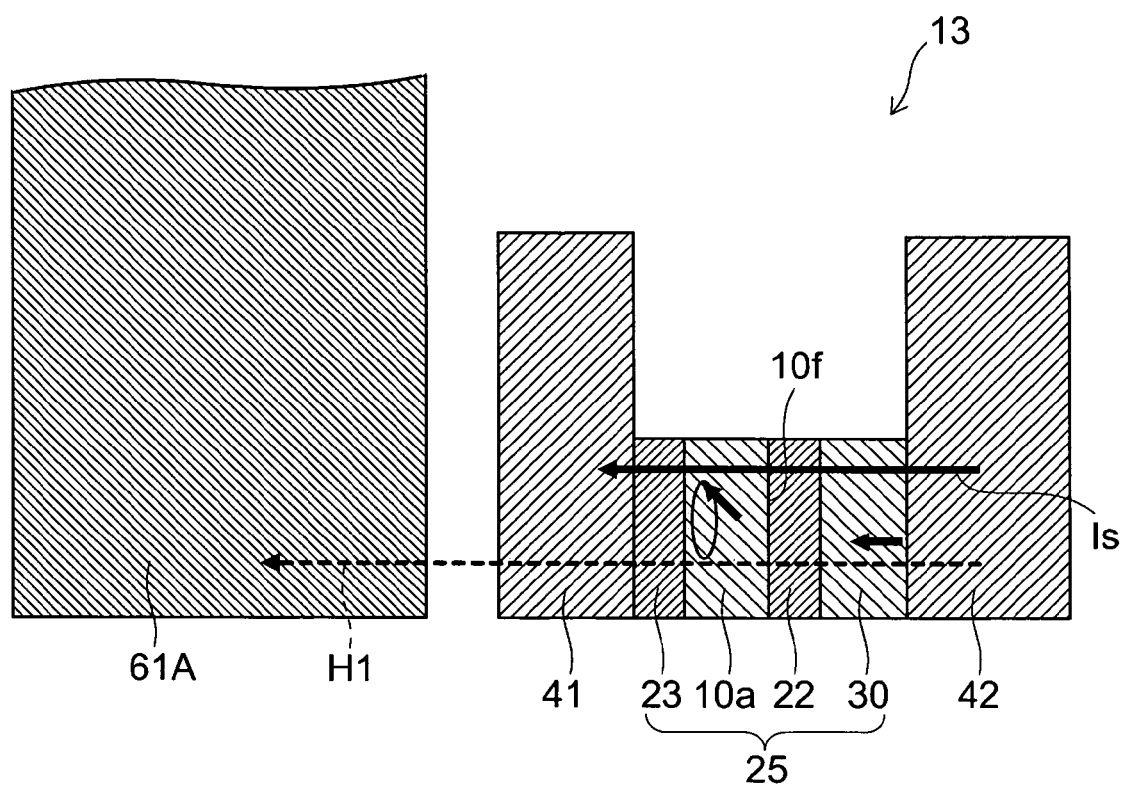
FIG. 3 is a sectional view schematically illustrating a configuration of a spin torque oscillator according to a third embodiment of the invention.

FIG. 3 is a sectional view schematically illustrating a configuration of a spin torque oscillator according to a third embodiment of the invention. As shown in FIG. 3, the spin torque oscillator 13 according to this embodiment is provided with the laminated structure 25 which further includes a crystalline improvement layer (a second non-magnetic layer) 23 disposed on the opposite side of the intermediate layer 22 of the oscillation layer 10a. The crystalline improvement layer 23 is a non-magnetic layer including at least one of Ta, Mo, Nb, V, Cr, and W.

The oscillation layer 10a is laminated on the crystalline improvement layer 23 to order disarray of atomic order on the surface of the oscillation layer 10a. The surface is on the opposite side of the intermediate layer 22. This allows it to acquire a uniform characteristic of the oscillation layer 10a, thereby enhancing a response efficiency of spins injected thereto. This results in a reduction of the driving current. Alternatively, the crystalline improvement layer 23 can double as the first electrode 41.

Third Example

A spin torque oscillator 103 (not shown) according to a third example is a spin torque oscillator made further including the crystalline improvement layer 23 on the opposite side of the oscillation layer 10a in the spin torque oscillator 102 according to the second example. That is, the spin torque oscillator 103 includes the following:
a 14-nm thick Cr film, which is formed on a 5 nm-thick MgO (100) layer, which is formed on an 5 nm-thick laminated underlayer including a Ta film and a Ru film, is provided as the crystalline improvement layer 23;
the bcc (110)-oriented $Fe_{35}Co_{35}Al_{30}$ film with a thickness of 5 nm, which is formed on the 14-nm thick Cr film, is provided as the oscillation layer 10a;
a 20-nm thick Cu film is provided on the oscillation layer 10a as the intermediate layer 22; and
a CoPt film is provided on the intermediate layer 22 as the spin injection layer 30.
The measurement for the driving current J of the spin torque oscillator 103 with such a configuration is shown in Table 5.

TABLE 5

|  |  | J |
|---|---|---|
| 103 | (Ta/Ru)/5 nm-Cr/14 nm-$Fe_{35}Co_{35}Al_{30}$/5 nm-Cu/20 nm-CoPt | 1.8 mA |

As shown in Table 5, the spin torque oscillator 103 further including the crystalline improvement layer 23 allowed it to further reduce the driving current J thereof.

Fourth Embodiment

Figure 4:
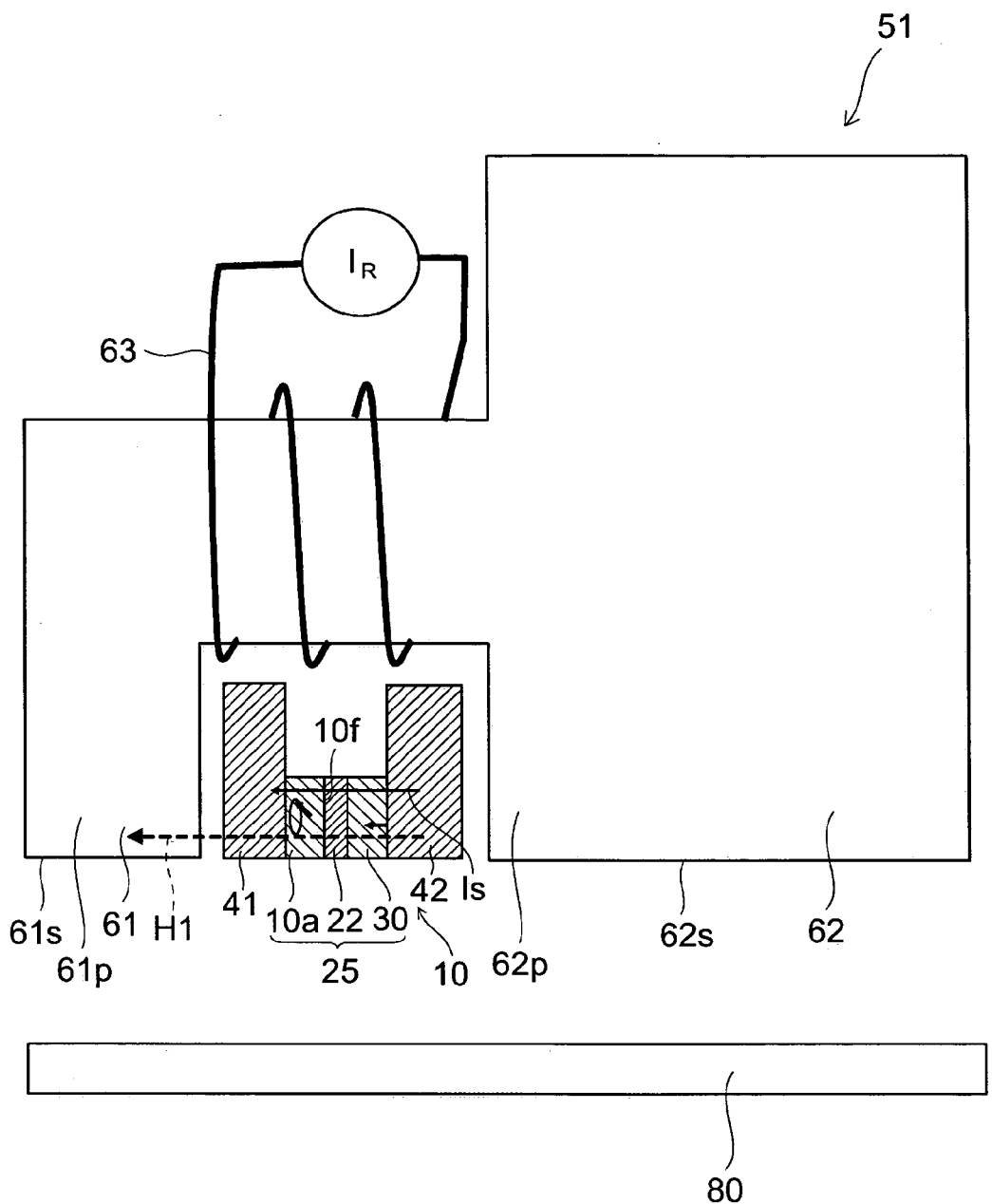
FIG. 4 is a schematic view illustrating a configuration of a magnetic recording head 51 according to a fourth embodiment of the invention.

FIG. 4 is a schematic view illustrating a configuration of a magnetic recording head according to a fourth embodiment of the invention. As shown in FIG. 4, the magnetic recording head 51 according to the fourth embodiment of the invention has a main magnetic pole 61, a return magnetic pole 62, and the spin torque oscillator 10 arranged parallel to the main magnetic pole 61.

The spin torque oscillator 10 can be replaced with any one of the spin torque oscillators 10, 12, 13, 101, 102 and 103 according to the embodiments and examples of the invention. The fourth example is explained below, provided the spin torque oscillator 10 is employed.

The magnetic recording head 51 is placed to operate so that the magnetic recording head 51 faces a magnetic recording medium 80. And the main magnetic pole 61 generates a magnetic field to write in the magnetic recording medium 80.

The return magnetic pole 62 refluxes the write-in magnetic field which returns from the magnetic recording medium 80 to the main magnetic pole 61.

The spin torque oscillator 10 can be provided between the main magnetic pole 61 and the return magnetic pole 62. Then, the oscillation layer 10a of the spin torque oscillator 10 is provided between the main magnetic pole 61 and the intermediate layer 22.

The main magnetic pole 61 faces the magnetic recording medium 80 through a medium-facing surface 61s of the main magnetic pole. The medium-facing surface 61s of the main magnetic pole is referred to as the "main medium-facing surface 61s" hereinafter. A portion with the medium-facing surface 61s is a medium-facing portion 61p of the main magnetic pole. The medium-facing portion 61p of the main magnetic pole is referred to as the "main medium-facing portion 61p" hereinafter.

Similarly, the return magnetic pole 62 faces the magnetic recording medium 80 through a medium-facing surface 62s of the return magnetic pole. The medium-facing surface 62s of the return magnetic pole is referred to as "return medium-facing surface 62s" hereinafter. A portion with the medium-facing surface 62s is a medium-facing portion 62p of the return magnetic pole. The medium-facing portion 62p of the return magnetic pole is referred to as the "return medium-facing portion 62p" hereinafter. The return medium-facing portion 62p faces the main medium-facing portion 61p.

The spin torque oscillator 10 is disposed between the medium-facing portions 61p and 62p. That is, the spin torque oscillator 10 is disposed between two portions in proximity to the medium-facing surfaces 61s, 62s.

The spin torque oscillator 10 is arranged so that the principal plane 10f of the laminated structure 25 thereof is perpendicular to the direction from the medium-facing potion 61p of the main magnetic pole to the medium-facing portion 62p of the return magnetic pole. Thereby, the magnetic field generated from the main magnetic pole 61 can be made substantially perpendicular to the principal plane 10f of the laminated structure 25 in the spin torque oscillator 10. That is, the magnetic field generated from the main magnetic pole 61 can be used as a substantially perpendicular magnetic field to be applied to the principal plane 10f of the laminated structure 25 in the spin torque oscillator 10.

In the example shown in FIG. 4, the first electrode 41 and the second electrode 42 are formed in addition to the main magnetic pole 61 and the return magnetic pole 62. However, at least one of the first and second electrodes 41, 42 can double as either one of the main magnetic pole 61 and the return magnetic pole 62.

Alternatively, the return magnetic pole 62 may double as the second electrode 42, and further as the spin injection layer 30. The magnetic recording head 51 according to the embodiment includes the following:
the main magnetic pole 61 to generate a write-in magnetic field for the magnetic recording medium 80; and
the spin torque oscillator 10 (any one of the spin torque oscillators of the embodiments of the present invention).
The spin injection layer 30 allows it to reflux the write-in magnetic field from the magnetic recording medium 80 to the main magnetic pole 61. The magnetic head with the return magnetic pole 62 formed in addition to the spin injection layer 30 is explained below.

As shown in FIG. 4, a portion on the side opposite to the main medium-facing surface 61s and a portion on the side opposite to the return medium-facing surface 62s are magnetically coupled with each other. This allows it to return the magnetic field (write-in magnetic field), which is generated from the main magnetic pole 61 and once applied to the magnetic recording medium 80, to the return magnetic pole. Thereby, this further allows it to focus the magnetic field (write-in magnetic field) onto the main medium-facing surface 61s. A coil 63 is formed near the magnetically coupled portion between the main magnetic pole 61 and the return magnetic pole 62. Then, passing a recording current $I_R$ through the coil 63 generates the write-in magnetic field from the main magnetic pole 61.

Such a structure allows it to generate a strong magnetic field between the main magnetic pole 61 and the return magnetic pole 62. Thus, it becomes possible to obtain the strong magnetic field necessary for the spin torque oscillator 10. Then, when the distance between the main medium-facing portion 61p and the return medium-facing portion 62p is too long, the magnetic field between the main magnetic pole and the return magnetic pole weakens as a result, thereby reducing the effect of spin oscillation. The distance between the main medium-facing portion 61p and the return medium-facing portion 62p is preferably less than 200 nm in order to acquire the clear effect of spin oscillation. On the other hand, when the distance is too short, the magnetic field generated therebetween is too strong. Therefore, the distance is preferably not less than 10 nm.

Figure 5:
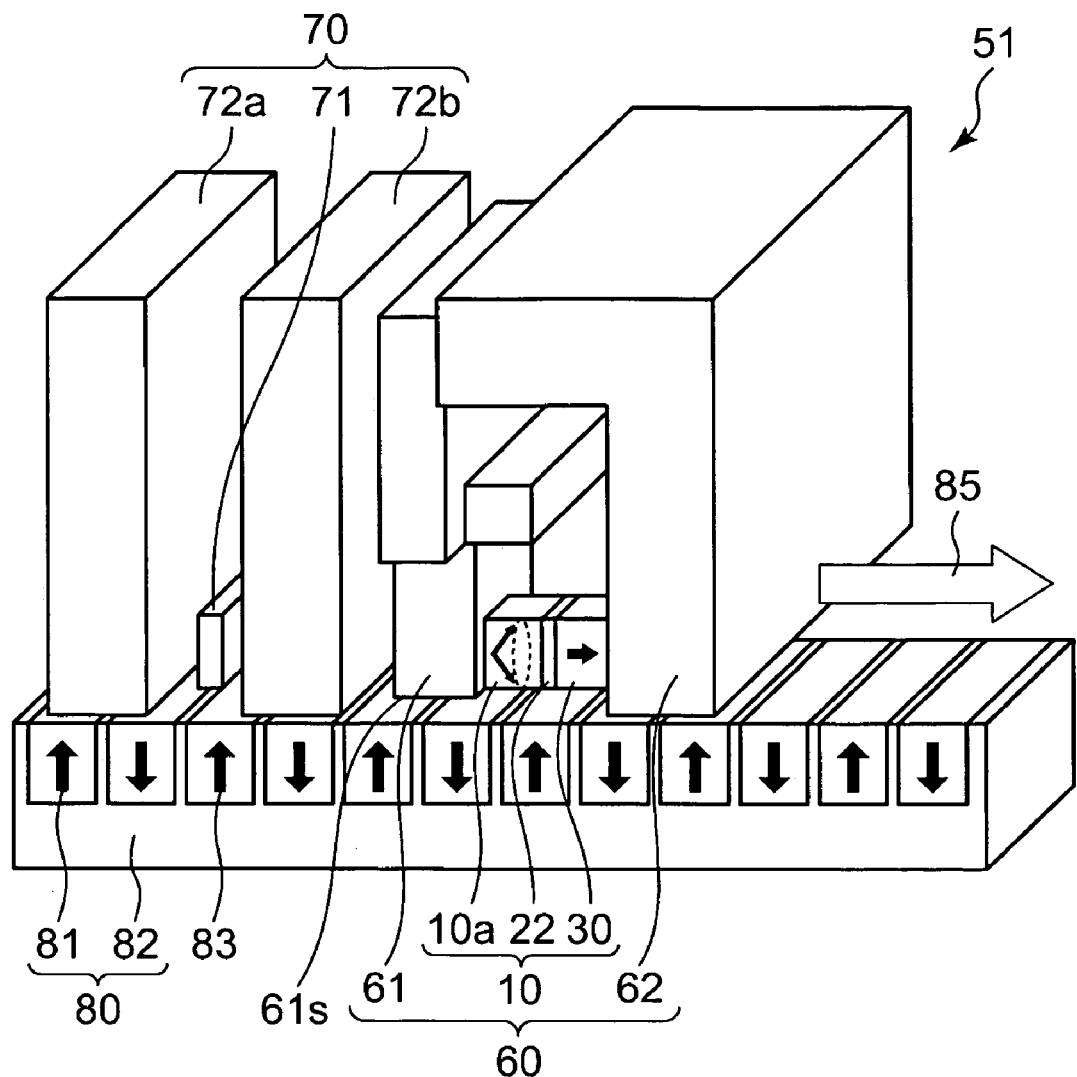
FIG. 5 is a perspective view schematically illustrating a configuration of another magnetic recording head 52 according to the fourth embodiment of the invention.
Figure 6:
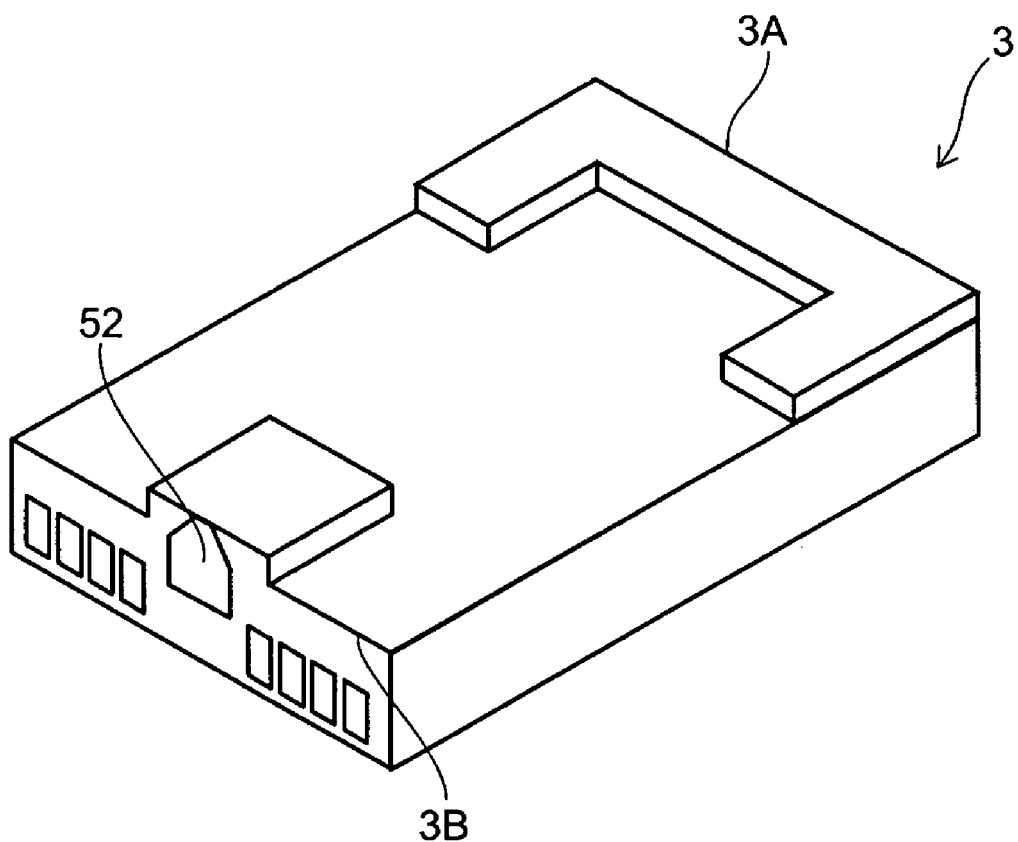
FIG. 6 is a perspective view schematically illustrating a configuration of a head slider onto which another magnetic recording head according to the fourth embodiment of the invention is mounted.

FIG. 5 is a perspective view schematically illustrating a configuration of another magnetic recording head 52 according to a fourth embodiment of the invention. FIG. 6 is a perspective view schematically illustrating a configuration of a head slider onto which another magnetic recording head 52 according to the fourth embodiment of the invention is mounted. As shown in FIG. 5, another magnetic recording head 52 according to the fourth embodiment of the invention has a writing head portion 60 and a reproducing head portion 70.

The writing head portion 60 is provided with the main magnetic pole 61, the return magnetic pole 62, and the spin torque oscillator 10 disposed therebetween. Alternatively, the spin torque oscillator 10 may be one of the spin torque oscillators according to the embodiments and examples of the invention. In this example, the first and second electrodes 41, 42 are made to double as the main magnetic pole 61 and the return magnetic pole 62, respectively.

The reproducing head portion 70 includes a first magnetic shield layer 72a, a second magnetic shield layer 72b and a magnetic reproducing element 71 provided between the first magnetic shield layer 72a and the second magnetic shield layer 72b. As a magnetic reproducing element 71, it is possible to employ a GMR element, a TMR (Tunnel Magneto-Resistive effect) element, etc. The magnetic reproducing element 71 is mounted between two magnetic shield layers, i.e., the first and second magnetic shield layers 72a, 72b. The above-mentioned respective elements of the reproducing head portion 70 and the writing head portion 60 are insulated by insulators, such as alumina, not shown in the figure.

And as shown in FIG. 5, the magnetic recording medium 80 is disposed to face the main medium-facing surface 61s of the magnetic recording head 52. And the main magnetic pole 61 applies a recording magnetic field (write-in magnetic field) to the magnetic recording medium 80. Alternatively, the main medium-facing surface 61s of the magnetic recording head 52 can be made to be a principal plane facing the magnetic recording medium 80 to be placed for the magnetic recording head 52. For example, as shown in FIG. 6, the magnetic recording head 52 is mounted on the head slider 3. The head slider 3 includes $Al_2O_3/TiC$, etc., and is designed to be produced so that the head slider 3 is capable of moving relatively to the recording medium 80, e.g., a magnetic disk with flying thereon or contacting thereto. The head slider 3 has an air inflow side 3A and an air outflow side 3B. The magnetic recording head 51 is arranged at the side surface of the air outflow, etc. Thereby, the magnetic recording head 51 mounted on the head slider 3 moves relatively to the magnetic recording medium 80 with flying thereon or contacting thereto.

As shown in FIG. 5, the magnetic recording medium 80 has a medium substrate 82 and a magnetic recording layer 81 provided on the substrate 82. The magnetization 83 of the magnetic recording layer 81 is controlled in a predetermined direction by the magnetic field applied from the writing head portion 60 to thus perform writing. In addition, the magnetic recording medium 80 moves in the medium moving direction 85 relatively to the magnetic recording head 52 at this time. On the other hand, the reproducing head portion 70 reads the magnetization directions of the magnetic recording layer 81.

As shown in FIG. 5, the spin torque oscillator 10 used for this embodiment is provided with a laminated structure 25. The laminated structure 25 includes the spin injection layer 30, the intermediate layer 22 and the oscillation layer 10a which are laminated in this order. The oscillation layer 10a generates a high frequency magnetic field by passing a driving electron flow through the laminated structure 25. The driving current density is suitably adjusted to obtain a predetermined oscillation state. In addition, when a recording track pitch is reduced and the size of the spin torque oscillator becomes small, heat release is promoted to allow it to reduce the driving current density.

The main magnetic pole 61 and the return path 62 include soft magnetic layers with comparatively large saturation magnetic flux density, such as FeCo, CoFe, CoNiFe, NiFe, CoZrNb, FeN, FeSi, FeAlSi, etc.

Alternatively, the material on the side of the medium-facing surface 61s of the main magnetic pole 61 is different from that of any portions other than on the side of the medium-facing surface 61s of the main magnetic pole 61. That is, in order to increase a magnetic field applied to the magnetic recording medium 80 or a magnetic field generated by the spin torque oscillator 10, FeCo, CoNiFe, FeN, etc. with a particularly large saturation magnetic flux density are employed for the materials of the portion on the side of the medium-facing surface 61s of the main magnetic pole. Any portions other than the side of the medium-facing surface 61s of the main magnetic pole 61 may include FeNi, etc. with a particularly high permeability. Alternatively, the size of the portion on the side of the medium-facing surface 61s of the main magnetic pole 61 may be smaller in order to enlarge the magnetic field applied to the magnetic recording medium 80 or the spin torque oscillator 10. Thereby, magnetic flux concentrates on the side of the medium-facing surface 61s. This allows it to generate a high magnetic field.

Materials, which are hard to be oxidized and have low resistances, such as Ti, Cu, etc. may be employed for the coil 63 of the main magnetic pole 61.

The magnetic recording head 52 with such a configuration can provide a magnetic head for high density recording due to the spin torque oscillator with a high intensity of the in-plane high frequency magnetic field, which is capable of causing a stable oscillation with a low current density and feeding a stable high frequency magnetic field.

Fifth Embodiment

A magnetic recording apparatus and a magnetic head assembly according to a fifth embodiment of the invention are explained below. The above-explained magnetic recording heads according to the embodiments of the present invention are built into the magnetic head assembly of all-in-one write-in/read-out type, and can be mounted into a magnetic recording apparatus. The magnetic recording apparatus according to this embodiment can also have only a recording function, and can also have both recording and reproducing functions.

Figure 7:
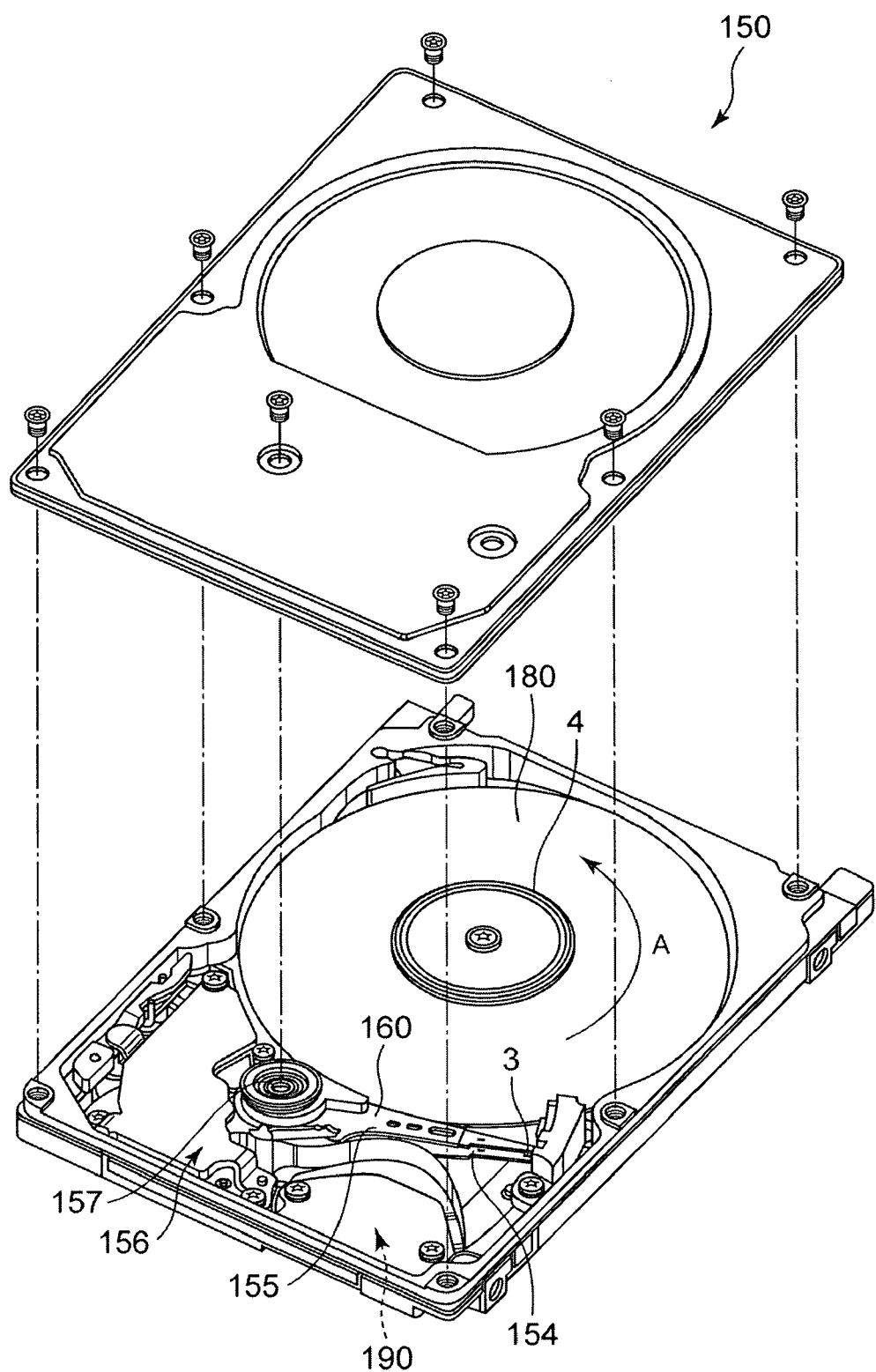
FIG. 7 is a perspective view schematically illustrating a configuration of a magnetic recording apparatus according to a fifth embodiment of the invention.
Figure 8A:
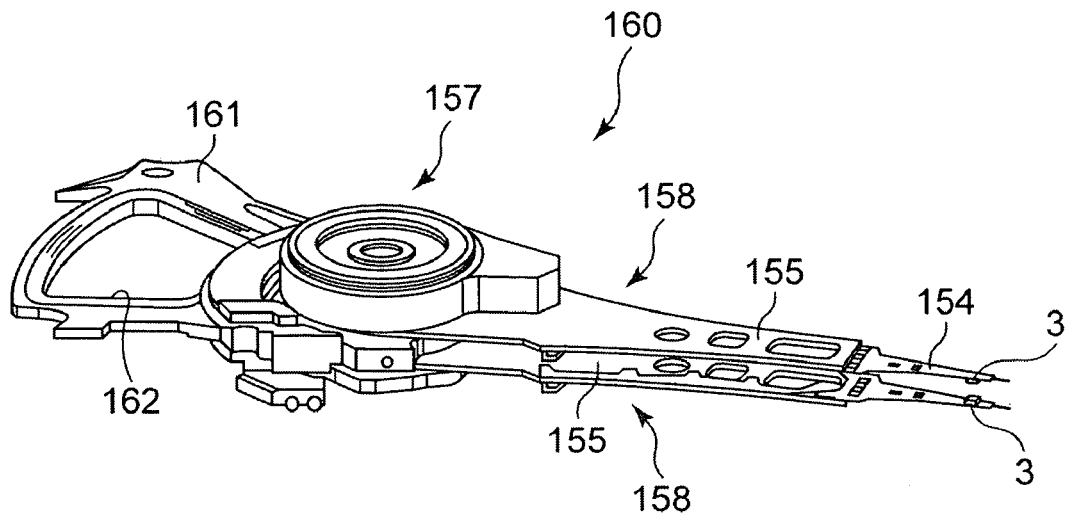
FIGS. 8A and 8B are typical perspective views illustrating a configuration of a portion of the magnetic recording apparatus according to the fifth embodiment of the invention.
Figure 8B:
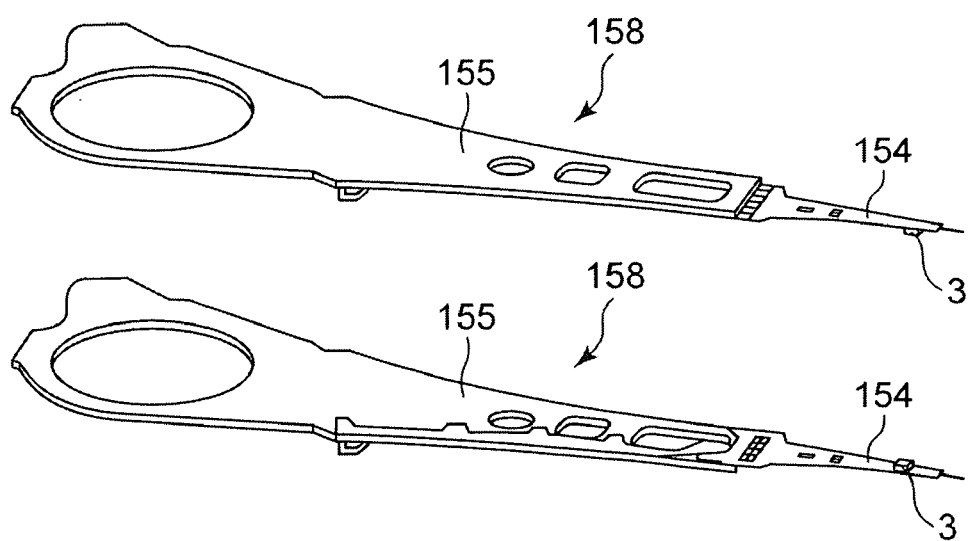

FIG. 7 is a perspective view schematically illustrating a configuration of the magnetic recording apparatus according to the fifth embodiment of the invention. FIGS. 8A and 8B are typical perspective views illustrating a configuration of a portion of the magnetic recording apparatus according to the fourth embodiment of the invention. As shown in FIG. 7, a magnetic recording apparatus 150 according to the fifth embodiment of the invention is a type of apparatus using a rotary actuator. As shown in FIG. 7, a recording medium disk 180 is mounted on a spindle motor 4, and is rotated in the direction of the arrow A by the motor not shown in the figure in response to control signals from a control portion of the driving unit not shown in the figure. Alternatively, the magnetic recording apparatus 150 according to this embodiment may be provided with two or more recording medium disks 180.

A head slider 3 which performs recording/reproducing information to be stored in the medium disk 180 has the configuration mentioned above, and is attached at the tip of a filmy suspension 154. Here, the head slider 3 mounts the magnetic recording head according to the embodiment mentioned above, for example, near the tip thereof.

The rotation of the recording medium disk 180 results in a balance between a pressure generated by the suspension 154 and a pressure arising at the medium-facing surface (ABS) of the head slider 3, holding the medium-facing surface of the magnetic recording head apart from the surface of the recording medium disk 180 with a prescribed flying height. The magnetic recording apparatus 150 may be of so called a "contact run type" where the head slider 3 runs in contact with the recording medium disk 180.

The suspension 154 is connected to an end of an actuator arm 155 with a bobbin portion to hold a drive coil not shown in the figure. The other end of the actuator arm 155 is provided with a voice coil motor 156, i.e., a kind of a linear motor. The voice coil motor 156 can be configured with a drive coil (not shown) and a magnetic circuit, the drive coil being wound up onto the bobbin portion of the actuator arm 155, the magnetic circuit including a permanent magnet arranged as facing so as to sandwich the coil and a facing yoke.

The actuator arm 155 is held by ball bearings which are provided on upper and lower two sides of a bearing portion 157, and can rotate slidably by the voice coil motor 156. As a result, it is possible to move the magnetic recording head to an arbitrary position of the recording medium disk 180.

FIG. 8A is a perspective view illustrating a configuration of a portion of the magnetic recording apparatus according to this embodiment, and enlarges a head stack assembly 160. FIG. 8B is a perspective view illustrating a magnetic head stack assembly (head gimbal assembly) 158 to configure a portion of the head stack assembly 160. As shown in FIG. 8A, the head stack assembly 160 is provided with the bearing portion 157, the head gimbal assembly (HGA) 158 and a support frame 161, the head gimbal assembly 158 extending from the bearing portion 157, the support frame 161 supporting a coil 162 of the vice coil motor while extending from the bearing portion 157 in a direction opposite to the HGA.

As shown in FIG. 8B, the head gimbal assembly 158 has an actuator arm 155 extending from the bearing portion 157 and a suspension 154 extending from the actuator arm 155.

The head slider 3 having the magnetic recording head according to the embodiment of the invention is attached to the tip of the suspension 154. As already explained, the magnetic recording head according to the embodiments of the invention is attached to the head slider 3.

That is, the magnetic head assembly (head gimbal assembly) 158 according to the embodiment of the invention is provided with the magnetic recording head according to the embodiment of the invention, the head slider 3 mounting the magnetic head, the suspension 154 mounting the head slider 3 at one end thereof and the actuator arm 155 connected to the other end of the suspension 154.

The suspension 154 has a lead for write-in/read-out of signals, a lead for a heater to adjust the flying height and a lead not shown in the figure for the oscillation of the spin torque oscillator, the leads electrically connecting to the respective electrodes of the magnetic head built into the head slider 3. The electrode pads not shown in the figure are provided in the head gimbal assembly 158. Eight electrode pads are provided in this example. That is, the head gimbal assembly 158 is provided with two pads for the coils of the main magnetic pole 61, two pads for a magnetic reproducing element 71, two pads for DFH (dynamic flying height), and two pads for electrodes of the spin torque oscillator 10.

A signal processing portion 190 not shown in the figure to perform write-in/read-out of signals for the magnetic recording medium using the magnetic recording head is also provided to the head gimbal assembly 158. The signal processing portion 190 is mounted onto the back side of the drawing of the magnetic recording apparatus 150 illustrated in FIG. 7, for example. Input-output lines are connected to the electrode pads of the head gimbal assembly 158, and electrically combined with the magnetic recording head.

Thus, the magnetic recording apparatus 150 according to this embodiment is provided with the magnetic recording medium, the magnetic recording head, a movable portion, a position control portion and a signal processing portion. The movable portion enables the magnetic recording medium and the magnetic recording head to relatively move to each other in separate or in contact while making the medium and the head face each other. The position control portion positions the magnetic recording head at a prescribed position on the magnetic recording medium. The signal processing portion performs write-in/read-out of signals for the magnetic recording medium.

That is, the recording medium disk 180 is used as the magnetic recording medium mentioned above. The above-mentioned movable portion can include the head slider 3. The above-mentioned position control portion can include the head gimbal assembly 158.

That is, the magnetic recording apparatus 150 according to this embodiment is provided with the magnetic recording medium (a magnetic recording disk 180), the magnetic head assembly (the head gimbal assembly 158) according to the embodiment of the invention, and the signal processing portion 190 that performs write-in/read-out of signals for the magnetic recording medium using the magnetic recording head mounted onto the magnetic head assembly.

According to the magnetic recording apparatus 150, using the spin torque oscillator and the magnetic recording head according to the embodiments mentioned above allows it to provide a high density magnetic recording apparatus due to the spin torque oscillator with a high in-plane high-frequency magnetic field, the spin torque oscillator being capable of stably causing the oscillation with a low current density and stably feeding a high frequency magnetic field.

Figure 9A:
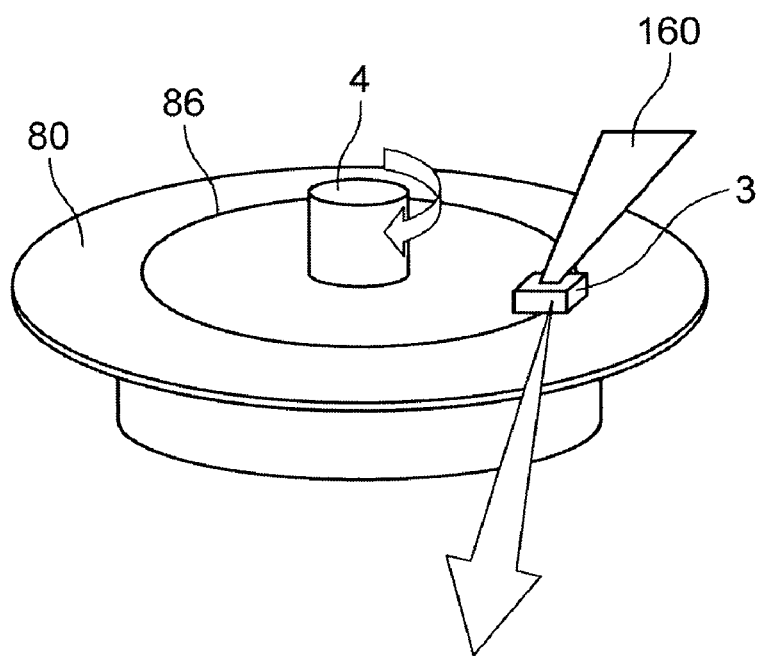
FIGS. 9A and 9B are typical perspective views illustrating a configuration of a magnetic recording medium of the magnetic recording apparatus according to the fifth embodiment of the invention.
Figure 9B:
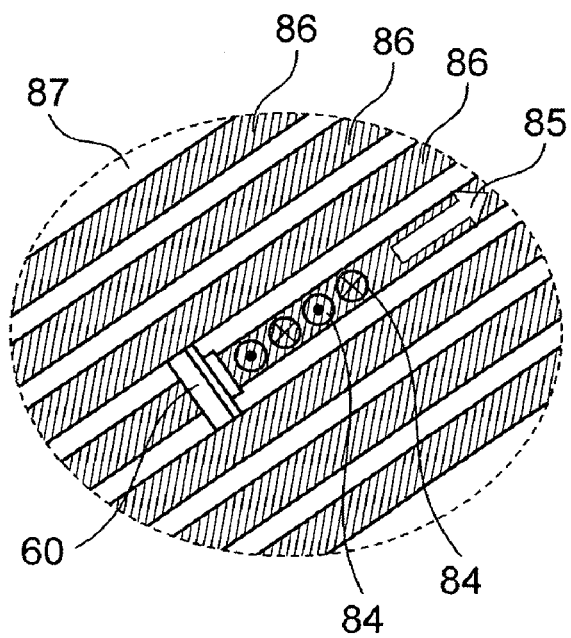

The magnetic recording medium which can be used for the magnetic recording apparatus of the embodiment mentioned above is explained below. FIGS. 9A and 9B are typical perspective views illustrating configurations of the magnetic recording medium of the magnetic recording apparatus according to the embodiment of the invention. As shown in FIGS. 9A and 9B, the magnetic recording medium 80 used for the magnetic recording apparatus according to the embodiment of the invention has magnetic discrete tracks (recording tracks) 86 including magnetic particles which are separated from each other by a nonmagnetic material (or air) 87 and have magnetization perpendicularly oriented to the medium surface. When this magnetic recording medium 80 is rotated by the spindle motor 4 and moves in the medium moving direction 85, one of the magnetic recording heads according to the embodiments mentioned above is arranged in a prescribed position to thereby form recorded regions of magnetization 84. Thus, the magnetic recording medium 80 may be a discrete track medium where the adjacent recording tracks were formed to be separated by the nonmagnetic portions in the magnetic recording medium according to the embodiment of the invention.

The width (TS) of the recording portion facing the recording tracks 86 of the spin torque oscillator 10 is set to the width (TW) of the tracks 86 or larger and the recording track pitch or narrower. This setting allows it to suppress a reduction in the coercive force of the adjacent recording tracks due to a high frequency magnetic stray field from the spin torque oscillator 10. For this reason, in magnetic recording medium 80 of this example, the high frequency magnetic field assist recording can be focused just on a correct track which should be recorded.

According to this example, it is easier to use the high frequency assist recording apparatus for a narrow track rather than to use a perpendicular magnetic recording medium formed of an unprocessed continuous film. According to a conventional magnetic recording method, it was impossible to use FePt, SmCo, etc. as magnetic fine particles, because the magnetic fine particles of FePt, SmCo, etc. with extremely high magnetic anisotropy energy (Ku) were too difficult to switch the magnetization direction thereof, i.e., to write in. However, according to the high frequency assist recording method, it is possible to employ the magnetic fine particles of FePt, SmCo, etc. which are reduced even to a nanometer size, and to provide a magnetic recording apparatus capable of attaining a linear recording density much higher than that of the conventional magnetic recording method. The magnetic recording apparatus according to this embodiment can firmly record even on the discrete type magnetic recording medium 80 with a high coercive force, allowing it to attain a high-density and rapid recording.

Figure 10A:
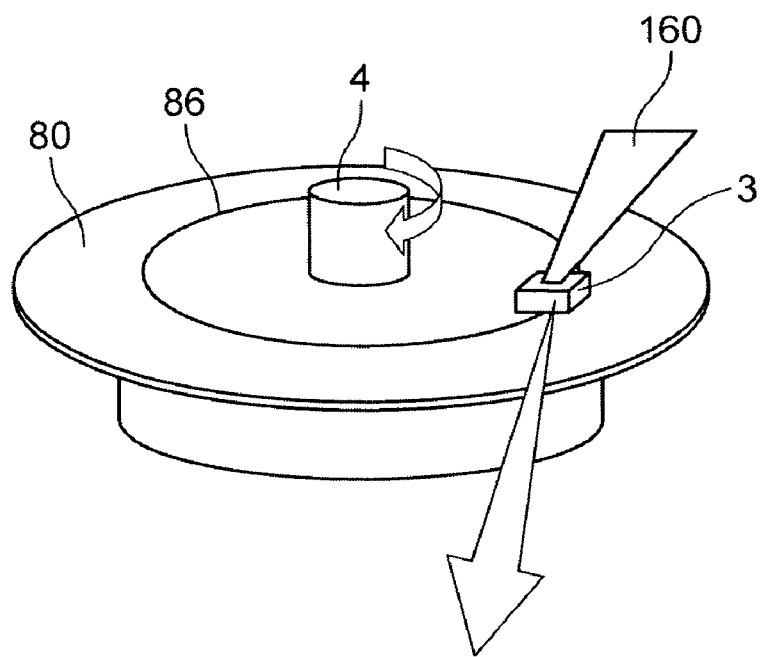
FIGS. 10A and 10B are typical perspective views illustrating a configuration of another magnetic recording medium of the magnetic recording apparatus according to the fifth embodiment of the invention.
Figure 10B:
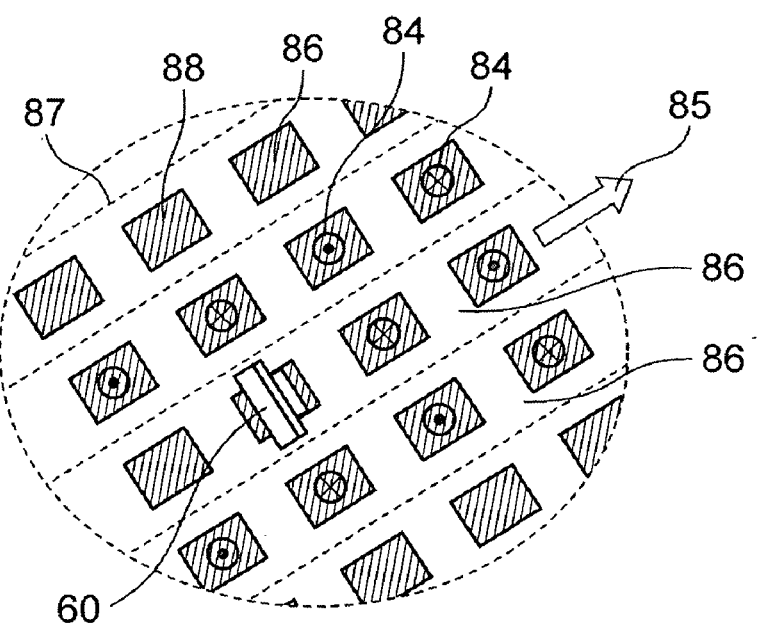

FIGS. 10A and 10B are typical perspective views illustrating configurations of another magnetic recording medium of the magnetic recording apparatus according to the embodiment of the invention. As shown in FIGS. 10A and 10B, another magnetic recording medium 80 which can be employed for the magnetic recording apparatus according to the embodiment of the invention has magnetic discrete bits 88 mutually separated by the nonmagnetic material 87. When this magnetic recording medium 80 is rotated by the spindle motor 4 and moves in the medium moving direction 85, the magnetic recording head according to the embodiment of the invention is arranged in a prescribed position to thereby form recorded magnetization 84. Thus, the magnetic recording medium 80 may be a discrete bit medium of which recording magnetic dots are separated by the nonmagnetic portions to be regularly arranged in the magnetic recording medium according to the embodiment of the invention.

The magnetic recording apparatus according to this embodiment can firmly record even on the discrete type magnetic recording medium 80 with a high coercive force, allowing it to attain a high-density and rapid recording.

The width (TS) of the recording portion facing the recording tracks 86 of the spin torque oscillator 10 is set to the width (TW) of the tracks 86 or larger and the recording track pitch or narrower. This setting allows it to suppress a reduction in the coercive force of the adjacent recording tracks due to a high frequency magnetic stray field from the spin torque oscillator 10. For this reason, in magnetic recording medium 80 of this example, the high frequency magnetic field assist recording can be focused just on the track which should be recorded. According to this example, enhancing the anisotropy energy (Ku) and miniaturizing the magnetic discrete bits 88 possibly lead to a high frequency magnetic field assist recording apparatus capable of attaining a high recording density of 10 Tbits/inch$^2$ or more, as long as the heat fluctuation tolerance of the bits 88 is maintained under the environment of usage thereof.

The embodiments of the invention have been explained with reference to the examples. However, the present invention is not limited to these examples. For example, when those skilled in the art appropriately select to combine two or more of the configurations of the spin torque oscillator, the magnetic recording head, the magnetic head assembly, and the magnetic recording apparatus from a known range, and the same effect as described above can be obtained, they are also incorporated in the present invention. What combined technically any two or more elements of the respective examples to the extent possible is included in the scope of the present invention as long as including the gist of the present invention.

When those skilled in the art appropriately change or modify the designs of the spin torque oscillator, the magnetic recording head, the magnetic head assembly, and the magnetic recording apparatus to practice all the changed or modified ones, and the same effect as described above can be obtained, they are also incorporated in the present invention.

In addition, those skilled in the art can change or modify the embodiments according to the invention. Then the changed or modified examples can be understood to be incorporated in the scope of the present invention.

What is claimed is:

1. A spin torque oscillator of a magnetic recording head, the spin torque oscillator comprising:
    a first magnetic layer including a magnetic film of a magnetic material, which has a body-centered cubic (bcc) structure and an oriented {110} plane thereof, the oriented {110} plane being oriented substantially parallel to a principal plane of the magnetic film;
    a second magnetic layer; and
    a first nonmagnetic layer being disposed between the first magnetic layer and the second magnetic layer,
    wherein
    a magnetic moment in the magnetic film precesses around an axis substantially perpendicular to the principal plane;
    wherein
    a magnetic field is applied in a direction substantially perpendicular to the principal plane; and
    wherein
    a current is passed in a direction substantially perpendicular to the principal plane.

2. The oscillator according to claim 1, wherein the magnetic film includes Fe with at least one selected from the group of Al, Si, Ga, Ge, P, Sn, and Cu added by a composition ratio of not less than 5 atomic % and not more than 50 atomic %.

3. The oscillator according to claim 1, wherein a thickness of the magnetic film is not less than a half of a thickness of the first magnetic layer and is not more than the thickness of the first magnetic layer.

4. The oscillator according to claim 1, wherein a thickness of the magnetic film is not less than 1 nm.

5. The oscillator according to claim 1, wherein the second magnetic layer has magnetic crystalline anisotropy in a direction perpendicular to the principal plane.

6. The oscillator according to claim 1, further comprising a second nonmagnetic layer being formed on the first magnetic layer on a side opposite to the first nonmagnetic layer, and including at least one of Ta, Mo, Nb, V, Cr, and W.

7. A magnetic recording head comprising:
    a main magnetic pole to generate a write-in magnetic field to be applied to a magnetic recording medium;
    a return magnetic pole for the write-in magnetic field returned from the magnetic recording medium; and
    a spin torque oscillator to be arranged parallel to the main magnetic pole, the spin torque oscillator including:
        a first magnetic layer including a magnetic film of a magnetic material with a body-centered cubic (bcc) structure and an oriented {110} plane of the body-centered cubic structure, the oriented {110} plane being oriented substantially parallel to a principal plane of the magnetic film;
        a second magnetic layer; and
        a first nonmagnetic layer being sandwiched between the first magnetic layer and the second magnetic layer,
    wherein
    a magnetic moment in the magnetic film precesses around an axis substantially perpendicular to the principal plane;
    wherein
    a magnetic field is applied in a direction substantially perpendicular to the principal plane; and
    wherein
    a current is passed perpendicularly to the principal plane.

8. The head according to claim 7, wherein the spin torque oscillator is provided between a side of a medium-facing portion of the main magnetic pole and a side of a medium-facing portion of the return magnetic pole, the side of the medium-facing portion of the main magnetic pole and the side of the medium-facing portion of the return magnetic pole facing each other.

9. The head according to claim 7, wherein a distance between the side of the medium-facing portion of the main magnetic pole and the side of the medium-facing portion of the return magnetic pole is not less than 10 nm and not more than 200 nm.

10. A magnetic recording head comprising:
    a main magnetic pole to generate a write-in magnetic field to be applied to a magnetic recording medium; and
    a spin torque oscillator to be arranged parallel to the main magnetic pole, the spin torque oscillator including:
        a first magnetic layer including a magnetic film of a magnetic material with a body-centered cubic (bcc) structure and an oriented {110} plane of the body-centered cubic structure, the oriented {110} plane being oriented substantially parallel to a principal plane of the magnetic film;
        a second magnetic layer; and a first nonmagnetic layer being sandwiched between the first magnetic layer and the second magnetic layer,
wherein
a magnetic moment in the magnetic film precesses around an axis substantially perpendicular to the principal plane;
wherein
a magnetic field is applied in a direction substantially perpendicular to the principal plane; and
wherein
a current is passed perpendicularly to the principal plane, wherein
the second magnetic layer in the spin torque oscillator comprises a return for the write-in magnetic field returned from the magnetic recording medium.

11. The head according to claim 7, wherein the first magnetic layer is provided between the main magnetic pole and the second magnetic layer.

12. A magnetic head assembly comprising:
a magnetic recording head including:
  a main magnetic pole to generate a write-in magnetic field to be applied to a magnetic recording medium;
  a return magnetic pole for the write-in magnetic field returned from the magnetic recording medium; and
  a spin torque oscillator to be arranged parallel to the main magnetic pole, the spin torque oscillator including:
    a first magnetic layer including a magnetic film of a magnetic material with a body-centered cubic (bcc) structure and an oriented {110} plane of the body-centered cubic structure, the oriented {110} plane being oriented substantially parallel to a principal plane of the magnetic film;
    a second magnetic layer; and
    a first nonmagnetic layer being sandwiched between the first magnetic layer and the second magnetic layer,
  wherein
  a magnetic moment in the magnetic film precesses around an axis substantially perpendicular to the principal plane;
  wherein
  a magnetic field is applied perpendicularly to the principal plane substantially; and
  wherein
  a current is passed perpendicularly to the principal plane,
a head slider to mount the magnetic recording head;
a suspension to mount the head slider on an end of the suspension; and
an actuator arm connected to another end of the suspension.

13. A magnetic recording apparatus comprising:
a magnetic recording medium;
a magnetic head assembly comprising:
  a magnetic recording head including:
    a main magnetic pole to generate a write-in magnetic field to be applied to a magnetic recording medium;
    a return magnetic pole for the write-in magnetic field returned from the magnetic recording medium; and
    a spin torque oscillator to be arranged parallel to the main magnetic pole, the spin torque oscillator including:
      a first magnetic layer including a magnetic film of a magnetic material with a body-centered cubic (bcc) structure and an oriented {110} plane of the body-centered cubic structure, the oriented {110} plane being oriented substantially parallel to a principal plane of the magnetic film;
      a second magnetic layer; and
      a first nonmagnetic layer being sandwiched between the first magnetic layer and the second magnetic layer,
    wherein
    a magnetic moment in the magnetic film precesses around an axis substantially perpendicular to the principal plane;
    wherein
    a magnetic field is applied in a direction substantially perpendicular to the principal plane; and
    wherein
    a current is passed perpendicularly to the principal plane,
  a head slider to mount the magnetic recording head;
  a suspension to mount the head slider on an end of the suspension;
  an actuator arm connected to another end of the suspension; and
  a signal processing portion to perform write-in of a signal in the magnetic recording medium and read-out of a signal from the magnetic recording medium by using the magnetic recording head.

14. The apparatus according to claim 13, wherein the spin torque oscillator is provided in a trailing side of the main magnetic pole.

15. The apparatus according to claim 13, wherein the magnetic recording medium is a discrete track medium of which recording tracks adjacent to each other are separated by a nonmagnetic portion.

16. The apparatus according to claim 13, wherein the magnetic recording medium is a discrete bit medium of which recording magnetic dots are separated by nonmagnetic portions regularly arranged.

17. The oscillator according to claim 1, wherein the magnetic film includes Fe with at least one selected from the group of Al, Si, Ga, Ge, P, Sn, and Cu added by a composition ratio of not less than 7 atomic % and not more than 40 atomic %.

* * * * *